(12) United States Patent
Ryuzaki et al.

(10) Patent No.: US 12,066,065 B2
(45) Date of Patent: Aug. 20, 2024

(54) CLUTCH CONTROL DEVICE

(71) Applicant: HONDA MOTOR CO., LTD., Tokyo (JP)

(72) Inventors: Tatsuya Ryuzaki, Tokyo (JP); Junya Ono, Tokyo (JP); Satoshi Kajiro, Tokyo (JP); Koji Inose, Tokyo (JP); Yuma Kaibe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/284,560

(22) PCT Filed: Mar. 9, 2022

(86) PCT No.: PCT/JP2022/010385
§ 371 (c)(1),
(2) Date: Sep. 28, 2023

(87) PCT Pub. No.: WO2022/209678
PCT Pub. Date: Oct. 6, 2022

(65) Prior Publication Data
US 2024/0240678 A1    Jul. 18, 2024

(30) Foreign Application Priority Data
Mar. 31, 2021    (JP) .................................. 2021-062193

(51) Int. Cl.
*F16D 48/06*    (2006.01)
(52) U.S. Cl.
CPC .... *F16D 48/064* (2013.01); *F16D 2500/3022* (2013.01); *F16D 2500/3026* (2013.01); *F16D 2500/5114* (2013.01)

(58) Field of Classification Search
CPC .................. F16D 48/064; F16D 28/00; F16D 2500/3022; F16D 2500/3026; F16D 2500/5114
See application file for complete search history.

(56) References Cited

U.S. PATENT DOCUMENTS

| | | | |
|---|---|---|---|
| 5,594,307 | A | 1/1997 | Adachi et al. |
| 2006/0223672 | A1 | 10/2006 | Kumazawa |
| 2009/0164058 | A1 | 6/2009 | Seufert et al. |
| 2021/0071720 | A1* | 3/2021 | Craig ...................... F16D 21/00 |

FOREIGN PATENT DOCUMENTS

| | | |
|---|---|---|
| JP | 07-327381 | 12/1995 |
| JP | 2006-275209 | 10/2006 |
| JP | 5004915 | 8/2012 |

OTHER PUBLICATIONS

International Search Report and Written Opinion for International Application No. PCT/JP2022/010385 mailed on May 17, 2022, 9 pages.

* cited by examiner

*Primary Examiner* — Timothy Hannon
(74) *Attorney, Agent, or Firm* — Amin, Turocy & Watson, LLP

(57) ABSTRACT

This clutch control device includes a clutch device configured to connect or disconnect power transmission between a prime mover and an output target, a clutch actuator configured to output a drive force for actuating the clutch device, and a control unit configured to control driving of the clutch actuator, in which the clutch actuator includes a plurality of drive sources that output the drive force.

6 Claims, 19 Drawing Sheets

CLUTCH CONTROL DEVICE

TECHNICAL FIELD

The present invention relates to a clutch control device.

The present application claims priority based on Japanese Patent Application No. 2021-062193 filed on Mar. 31, 2021, the contents of which are incorporated herein by reference.

BACKGROUND ART

In recent saddle-riding vehicles, an automatic clutch system has been proposed in which the connecting and disconnecting operation of a clutch device is automatically performed by electrical control (refer to, for example, Patent Document 1).

RELATED ART DOCUMENT

Patent Document

Patent Document 1: Japanese Patent No. 5004915

SUMMARY

Problems to be Solved by the Invention

In the prior art described above, a hydraulic pressure is supplied from a hydraulic actuator to a slave cylinder to disconnect a clutch device. Control of the clutch device is based on a value of the hydraulic pressure.

Incidentally, in a system in which connection and disconnection of a clutch device is automatically performed, it is desired to study a failsafe for when a drive source such as an electric motor or its control unit has failed.

The present invention has been made in view of the circumstances described above, and an object of the present invention is to achieve a failsafe of a clutch drive system in a clutch control device for controlling connection and disconnection of a clutch device.

Means for Solving the Problem

To solve the problems described above, a clutch control device according to one aspect of the present invention includes a clutch device configured to connect or disconnect power transmission between a prime mover and an output target, a clutch actuator configured to output a drive force for actuating the clutch device, and a control unit configured to control driving of the clutch actuator, in which the clutch actuator includes a plurality of drive sources that output the drive force, and when one of the plurality of drive sources becomes undrivable, the clutch device is once disconnected by the other of the plurality of drive sources, and then is gradually connected thereafter.

According to this configuration, the clutch actuator includes a plurality of drive sources, and thereby it is possible to reduce a load on each drive source and achieve a decrease in size. In addition, it is possible to achieve a failsafe of the clutch driving system by the plurality of drive sources.

In addition, it is possible to prevent the clutch device from being maintained in a connected state even when an abnormality occurs in driving one of the plurality of drive sources. In addition, it is possible to suppress a change in behavior of a vehicle by gradually shifting to the connected state after the clutch device is disconnected.

In the aspect described above, the control unit may feedback-control a current supplied to each of the plurality of drive sources.

According to this configuration, it is possible to suppress variations in load among the plurality of drive sources by feedback-controlling a current supplied to each drive source to a target value.

In the aspect described above, the control unit may include a plurality of drive control means independent from each other, and each of the plurality of drive sources may be independently controllable by any one of the plurality of drive control means.

According to this configuration, any one of the plurality of drive control means can drive a plurality of normal drive sources. For this reason, it is possible to continue driving the clutch actuator. This effect can be obtained even if one of the plurality of drive sources fails or one of the plurality of drive control means malfunctions, and one of the plurality of drive sources is not drivable.

In the aspect described above, when one of the plurality of drive sources becomes undrivable, a drive current for driving the other of the plurality of drive sources may be set larger than that for normal drive, and only one cycle of clutch disconnection and connection may be performed.

According to this configuration, when one of the plurality of motors has failed, a lack of power can be eliminated. On the other hand, a process of connecting the clutch device after disconnecting it once is configured to be performed in only one cycle, and thereby the following effects are obtained. That is, the actuator is driven with a current value larger than a normal control amount, driven to a fail stop position in one cycle, and stopped. As a result, it is possible to shift to a fail mode while suppressing heat generation with a minimum operation.

In the aspect described above, a fail-safe relay may be included in a current supply line of the plurality of drive sources, and the clutch device may be gradually connected by intermittently driving the fail-safe relay when a failure has occurred in one of the plurality of drive sources.

In the aspect described above, when one of the plurality of drive sources becomes undrivable, a drive current for driving the other of the plurality of drive sources may be set larger than that for normal drive, and only one cycle of clutch disconnection and connection may be performed.

Advantage of the Invention

According to the present invention, a clutch control device that controls the connection and disconnection of a clutch device can achieve a failsafe of a clutch drive system.

DESCRIPTION OF THE EMBODIMENTS

Figure 1:
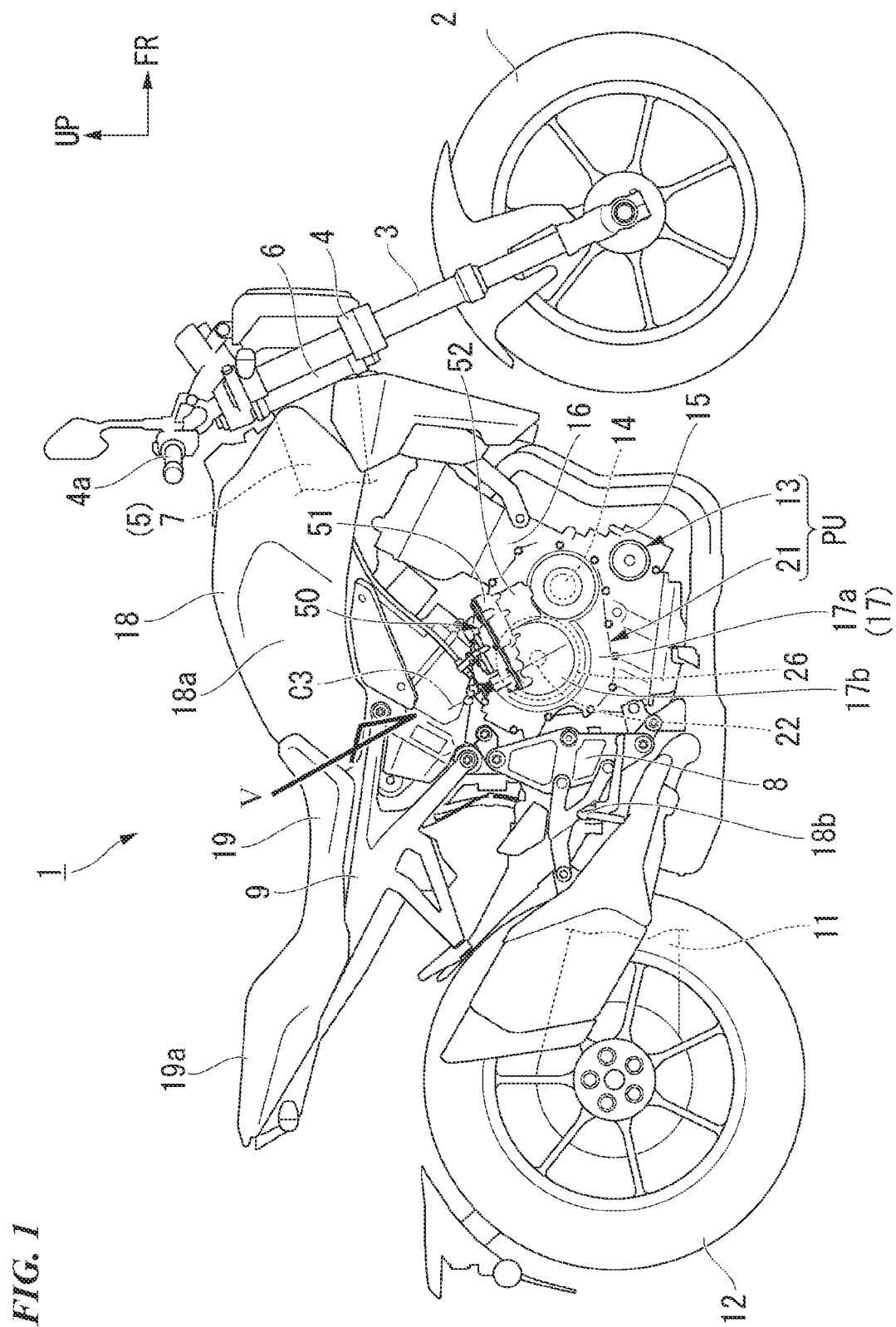
FIG. 1 is a right-side view of a motorcycle of an embodiment.

Hereinafter, embodiments of the present invention will be described with reference to the drawings. Note that it is assumed that directions such as front, back, left, and right in the following description are the same as directions of a vehicle described below unless otherwise specified. An arrow FR indicating a front of the vehicle, an arrow LH indicating a left of the vehicle, and an arrow UP indicating an upper side of the vehicle are shown at appropriate places in the drawings used in the following description.

<Entire Vehicle>

As shown in FIG. 1, the present embodiment is applied to a motorcycle 1 as an example of a saddle type vehicle. A front wheel 2 of the motorcycle 1 is supported by lower end portions of a pair of left and right front forks 3. Upper portions of the left and right front forks 3 are supported by a head pipe 6 at a front-end portion of a vehicle body frame 5 via a steering stem 4. A bar-type steering handle 4a is attached to a top bridge of the steering stem 4.

The vehicle body frame 5 includes the head pipe 6, a main frame 7 extending downward and rearward from the head pipe 6 at a center in a vehicle width direction (a horizontal direction), a pivot frame 8 provided below a rear end of the main frame 7, and a seat frame 9 that extends behind the main frame 7 and the pivot frame 8. A front end of a swing arm 11 is supported on the pivot frame 8 so that it can swing. A rear wheel 12 of the motorcycle 1 is supported at the rear end portion of the swing arm 11.

A fuel tank 18 is supported above the left and right main frames 7. A front seat 19 and a rear seat 19a are supported behind the fuel tank 18 and above the seat frame 9. Knee grip portions 18a recessed inward in the vehicle width direction are formed on both left and right sides of a rear portion of the fuel tank 18. The left and right knee grip portions 18a are formed to match at the following portions. The portions are insides of left and right knees of a driver seated on the front seat 19. Steps 18b are supported on both left and right sides below the front seat 19. The driver places her or his feet from the ankles onward on the steps 18b.

A power unit PU including a prime mover of the motorcycle 1 is suspended below the main frame 7. The power unit PU integrally has an engine (an internal combustion engine, a prime mover) 13 positioned on the front side and a transmission 21 positioned on the rear side. The engine 13 is, for example, a multi-cylinder engine in which a rotating axis of a crank shaft 14 is disposed in the horizontal direction (the vehicle width direction).

The engine 13 causes a cylinder 16 to be upright above a front portion of the crankcase 15. A rear portion of the crankcase 15 is set to be a transmission case 17 that accommodates the transmission 21. A right cover 17a crossing a right-side portion of the transmission case 17 is attached to a right-side portion of the crankcase 15. The right cover 17a is also a clutch cover that covers the clutch device 26. The power unit PU is linked to the rear wheel 12 via, for example, a chain-type power transmission mechanism (not shown).

<Transmission>

Figure 2:
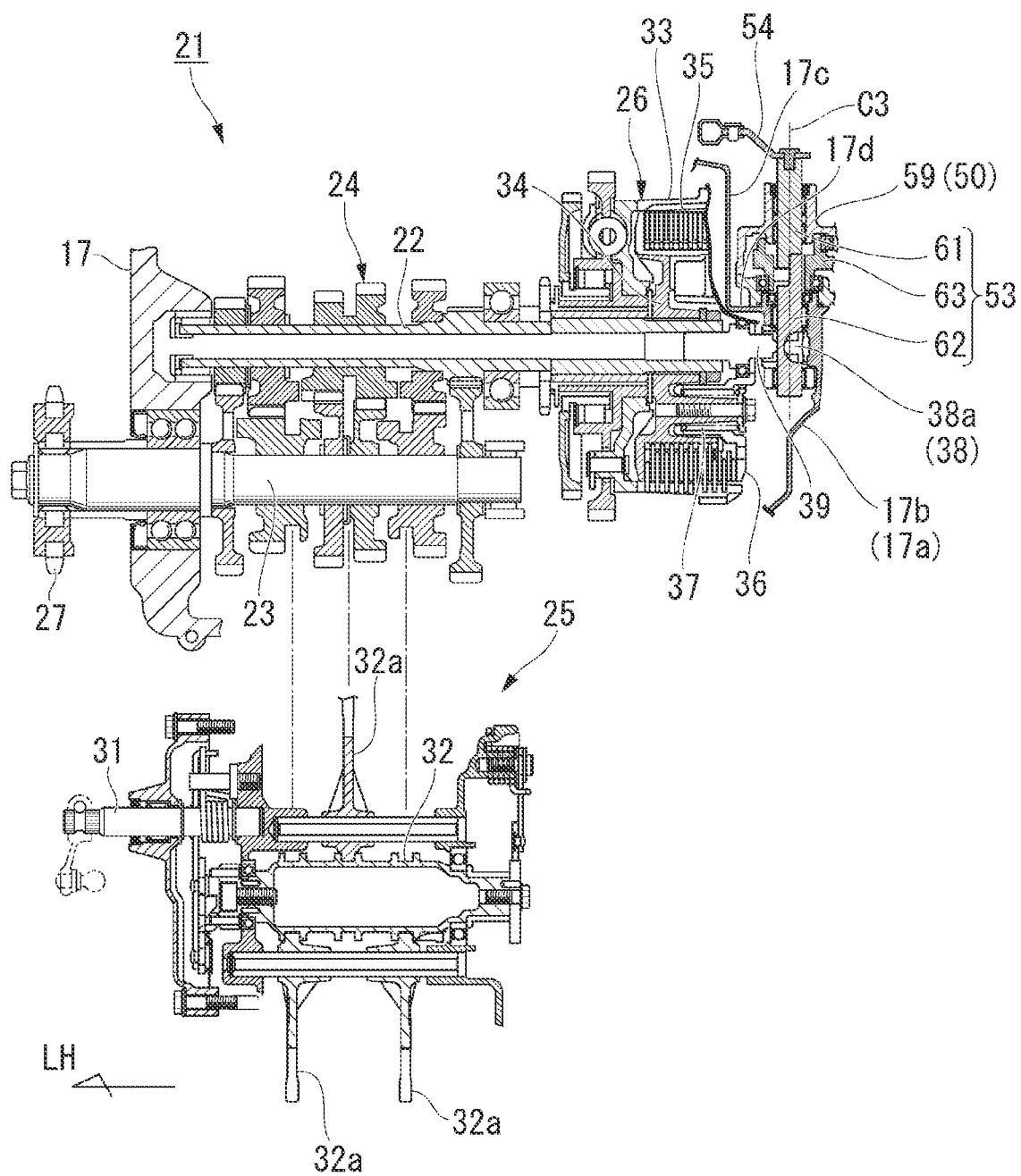
FIG. 2 is a sectional view of a transmission and a change mechanism of the motorcycle.

Also with reference to FIG. 2, the transmission 21 is a stepped transmission. The transmission 21 has a main shaft 22, a counter shaft 23, and a transmission gear group 24 spanning both shafts 22 and 23. The counter shaft 23 constitutes an output shaft of the transmission 21 and the power unit PU. A left end portion of the counter shaft 23 protrudes to a left side of a rear portion of the transmission case 17 and is connected to the rear wheel 12 via the chain-type power transmission mechanism.

The main shaft 22 and the counter shaft 23 of the transmission 21 are disposed behind the crank shaft 14. A clutch device 26 is coaxially disposed at a right end portion of the main shaft 22. The clutch device 26 connects or disconnects power transmission between the crank shaft 14 of the engine 13 and the main shaft 22 of the transmission 21. The clutch device 26 performs a connection or disconnection operation according to at least one of an operation of a clutch operator (for example, a clutch lever that is not shown) by an occupant and an operation of a clutch actuator 50 which will be detailed below.

The clutch device 26 is, for example, a wet multi-plate clutch, a so-called normally closed clutch. Rotational power of the crank shaft 14 is transferred to the main shaft 22 via the clutch device 26 and transferred from the main shaft 22 to the counter shaft 23 via any gear pair of the transmission gear group 24. A drive sprocket 27 of the chain-type power transmission mechanism is attached to a left end portion of the counter shaft 23 protruding to a left side of the rear portion of the crankcase 15.

A change mechanism 25 for switching gear pairs of the transmission gear group 24 is accommodated in the vicinity of the transmission 21 within the transmission case 17. The change mechanism 25 has a shift drum 32 in a hollow cylindrical shape, parallel to the shafts 22 and 23. By rotating this shift drum 32, the change mechanism 25 actuates a plurality of shift forks 32a. This operation is performed according to a pattern of lead grooves formed on an outer circumference of the shift drum 32. According to this operation, the change mechanism 25 switches gear pairs used for power transmission between the shafts 22 and 23 in the transmission gear group 24.

Here, in the motorcycle 1, the driver performs only a shifting operation of the transmission 21 (a foot operation of a shift pedal (not shown)), and the connection or disconnection operation by the clutch device 26 is automatically performed under electrical control according to an operation of the shift pedal. That is, the motorcycle 1 employs a so-called semi-automatic transmission system (an automatic clutch type transmission system).

<Transmission System>

Figure 3:
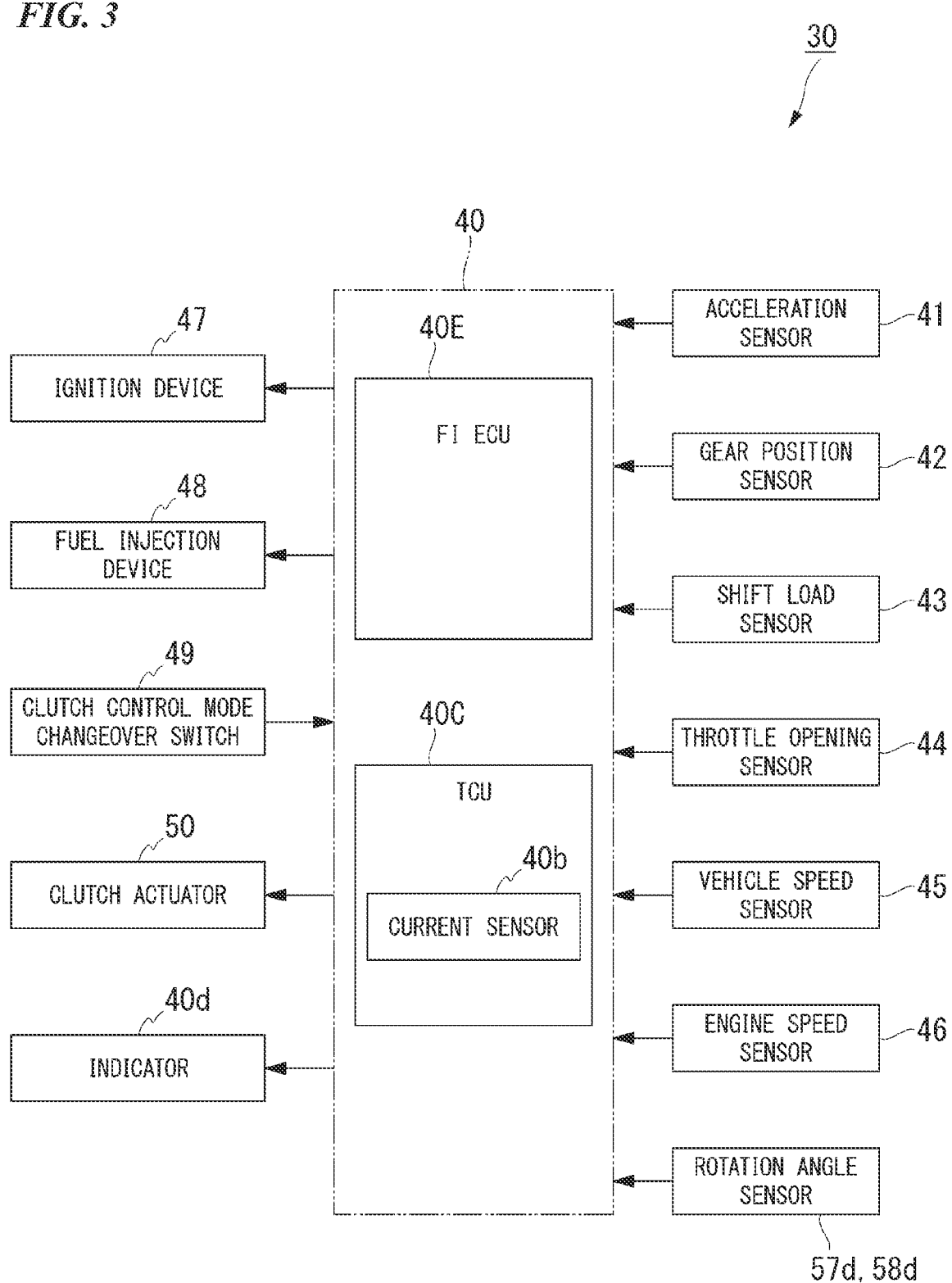
FIG. 3 is a block diagram of a transmission system of the motorcycle.

As shown in FIG. 3, the transmission system 30 described above includes the clutch actuator 50, a control unit 40, various sensors 41 to 46, 57d, and 58d, and various devices 47, 48, and 50.

The control unit 40 controls operations of an ignition device 47 and a fuel injection device 48, and also controls an operation of the clutch actuator 50. This control is performed on the basis of detection information from an acceleration sensor 41, a gear position sensor 42, and a shift load sensor 43 (for example, a torque sensor), various vehicle state detection information from a throttle opening sensor 44, a vehicle speed sensor 45, and an engine speed sensor 46, and the like, and the like.

The acceleration sensor 41 detects a behavior of a vehicle body. The gear position sensor 42 detects a gear change from a rotation angle of the shift drum 32. The shift load sensor 43 detects an operation torque input to a shift spindle 31 (refer to FIG. 2) of the change mechanism 25. The throttle opening sensor 44 detects a throttle opening. The vehicle speed sensor 45 detects a vehicle speed. The engine speed sensor 46 detects an engine speed.

The control unit 40 has a clutch control unit 40C and an engine control unit 40E that are independent from each other. The clutch control unit 40C mainly controls driving of the clutch actuator 50. The engine control unit 40E mainly controls driving of the engine 13. The clutch control unit 40C and the engine control unit 40E are configured as, for example, electronic control units (ECU) separate from each other. The clutch control unit 40C and the engine control unit 40E may be configured in an integrated ECU as long as they perform independent control from each other.

Figure 5:
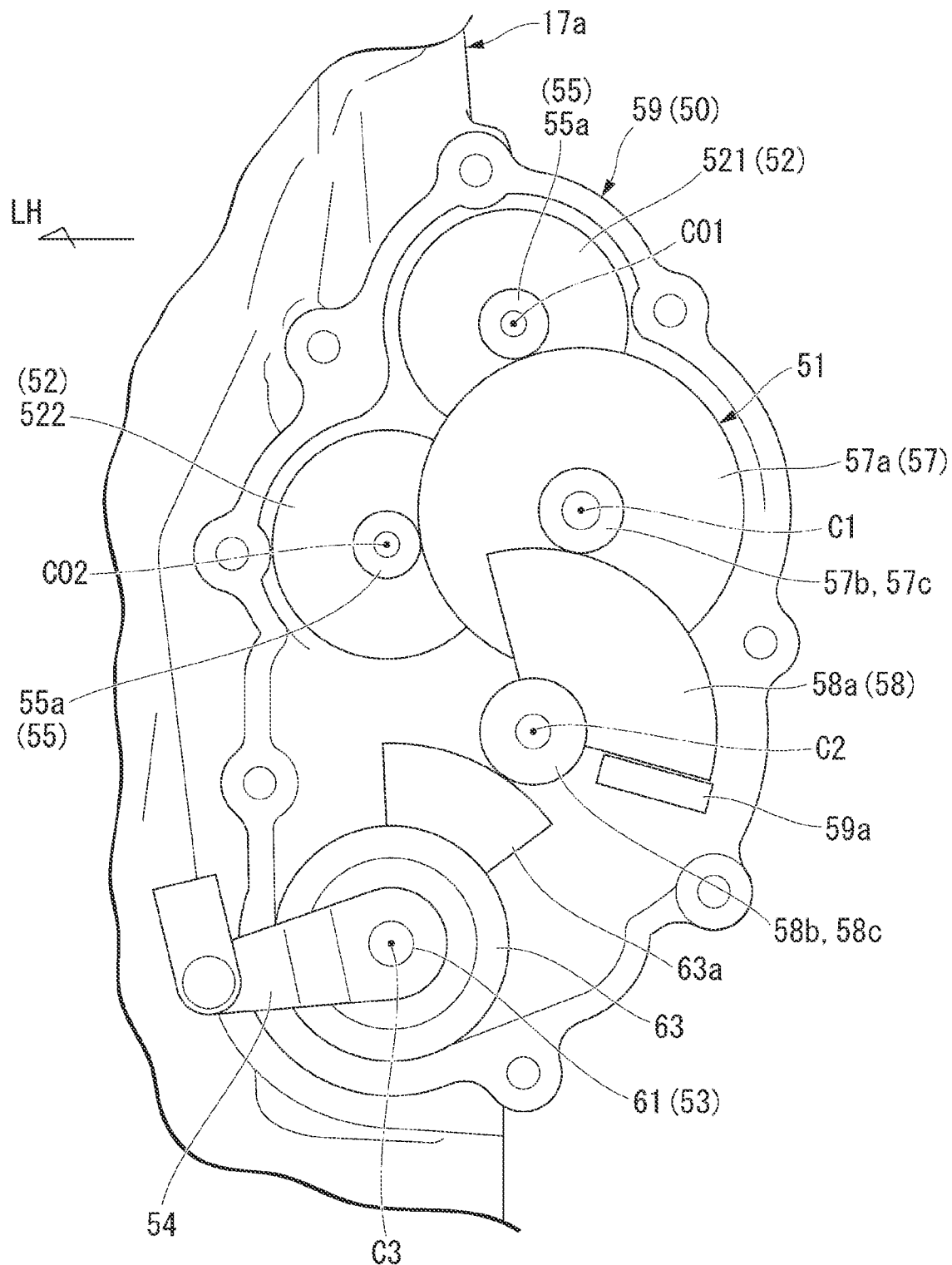
FIG. 5 is a view in a direction of an arrow V of FIG. 1, and shows an axial view of a clutch actuator.
Figure 6:
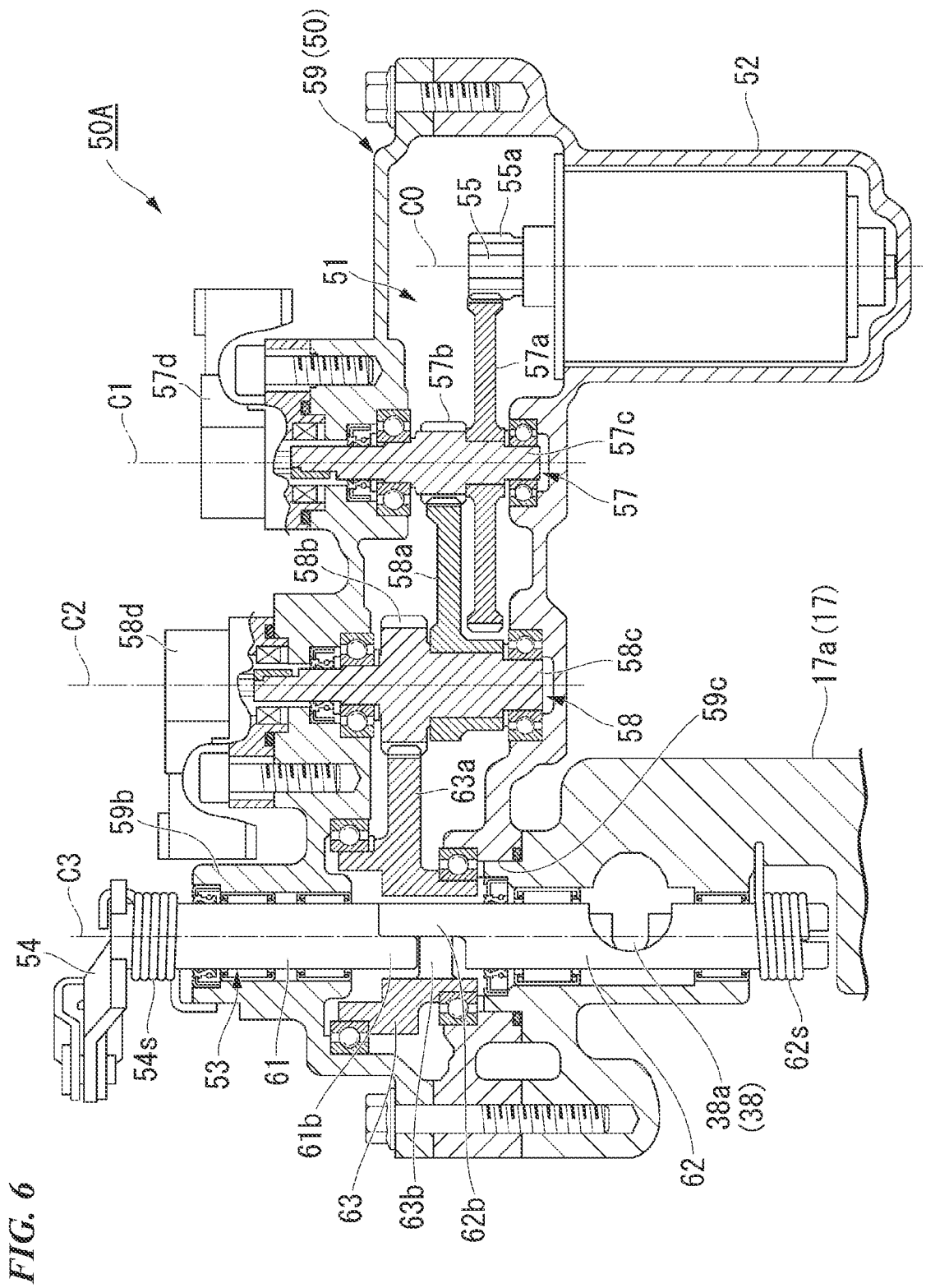
FIG. 6 is an expanded sectional view along an axial direction of the clutch actuator.

Referring also to FIGS. 5 and 6, the clutch actuator 50 controls an actuation torque applied to a release shaft 53 to connect or disconnect the clutch device 26. The clutch actuator 50 has an electric motor 52 (hereinafter simply referred to as a motor 52) as a drive source and a deceleration mechanism 51 that transfers a drive force of the motor 52 to the release shaft 53. The deceleration mechanism 51 includes a first reduction shaft 57 and a second reduction shaft 58. Each of these shafts 57 and 58 is provided with a first rotation angle sensor 57d and a second rotation angle sensor 58d for detecting the rotation angle.

The clutch control unit 40C calculates the following current value on the basis of a calculation program set in advance. This current value is a value of current to be supplied to the motor 52 to connect or disconnect the clutch device 26. The current to be supplied to the motor 52 is determined based on a correlation with a torque to be output by the motor 52. A target torque of the motor 52 is proportional to an operating torque (a driven clutch lever torque to be described below) applied to the release shaft 53. The current value supplied to the motor 52 is detected by a current sensor 40b included in the clutch control unit 40C. An operation of the clutch actuator 50 is controlled according to a change in this detected value. The clutch actuator 50 will be described in detail below.

<Clutch Device>

Figure 11:
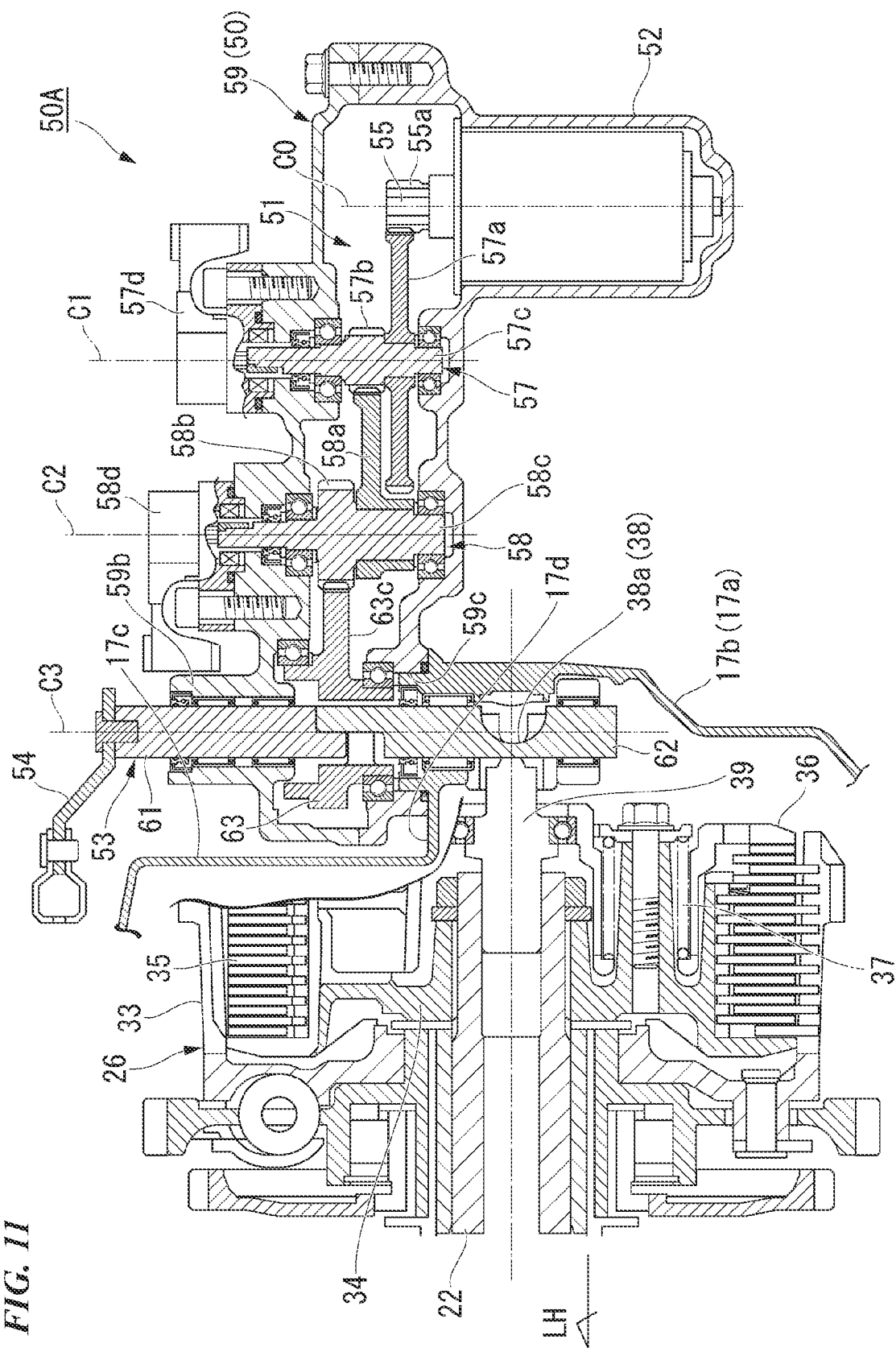
FIG. 11 is a sectional view corresponding to FIG. 6 which shows a state in which the clutch actuator is attached to a right cover.

As shown in FIGS. 2 and 11, the clutch device 26 of the embodiment is a multi-plate clutch in which a plurality of clutch plates 35 are laminated in an axial direction, and is a wet clutch disposed in an oil chamber in the right cover 17a. The clutch device 26 includes a clutch outer 33, a clutch center 34, and a plurality of clutch plates 35.

The clutch outer 33 drives with rotational power constantly transferred from the crank shaft 14. The clutch center 34 is disposed inside the clutch outer 33 and supported by the main shaft 22 so as to be integrally rotatable. The plurality of clutch plates 35 are laminated between the clutch outer 33 and the clutch center 34, and causes these to be frictionally engaged.

A pressure plate 36 having substantially the same diameter as the clutch plate 35 is disposed on a right (outward in the vehicle width direction) of the laminated clutch plates 35. The pressure plate 36 receives an elastic load of the clutch spring 37 to be biased to the left, and causes the laminated clutch plates 35 to be pressed and contacted each other (to be frictionally engaged). As a result, the clutch device 26 is in a connected state in which power transmission is possible. The clutch device 26 is a normally closed clutch that is normally in the connected state when there is no external input.

The pressure contact (frictional engagement) is released by an operation of the release mechanism 38 inside the right cover 17a. The operation of the release mechanism 38 is performed by at least one of an operation of the clutch lever (not shown) by the occupant and an application of a torque by the clutch actuator 50.

<Release Mechanism>

As shown in FIGS. 2 and 11, the release mechanism 38 includes a lifter shaft 39 and a release shaft 53.

The lifter shaft 39 is held in a right-side portion of the main shaft 22 so that it can reciprocate in the axial direction. The release shaft 53 is disposed so that its axial direction is orthogonal to the lifter shaft 39, and is held on an outer side of the right cover 17a so that it can rotate around its axial center.

A line C3 in FIGS. 2 and 11 indicates a central axis of the release shaft 53 extending in a vertical direction. The release shaft 53 is axially inclined rearward so that the upper side is positioned rearward with respect to the vertical direction when viewed in the axial direction of the main shaft 22 (when viewed from a side of the vehicle) (refer to FIG. 1). An upper portion of the release shaft 53 protrudes to the outside of the right cover 17a, and a driven clutch lever 54 is attached to this upper portion of the release shaft 53 so as to be integrally rotatable. The driven clutch lever 54 is connected to the clutch lever via an operation cable (not shown).

An eccentric cam portion 38a is provided on a lower portion of the release shaft 53 positioned inside the right cover 17a. The eccentric cam portion 38a is engaged with a right end portion of the lifter shaft 39. The release shaft 53 rotates around its axial center to move the lifter shaft 39 rightward according to an action of the eccentric cam portion 38a. The lifter shaft 39 is configured so that it can reciprocate integrally with the pressure plate 36 of the clutch device 26. Therefore, when the lifter shaft 39 moves rightward, the pressure plate 36 moves (lifts) rightward against a biasing force of the clutch spring 37. As a result, the frictional engagement between the laminated clutch plates 35 is released. As a result, the normally closed clutch device 26 is in a disconnected state in which power transmission is not possible.

In addition, the release mechanism 38 is not limited to an eccentric cam mechanism, and may be provided with a rack and pinion, a feed screw, or the like. A mechanism that connects the clutch lever and the driven clutch lever 54 is not limited to an operation cable, and may be provided with a rod, a link, or the like.

<Clutch Control Mode>

Figure 4:
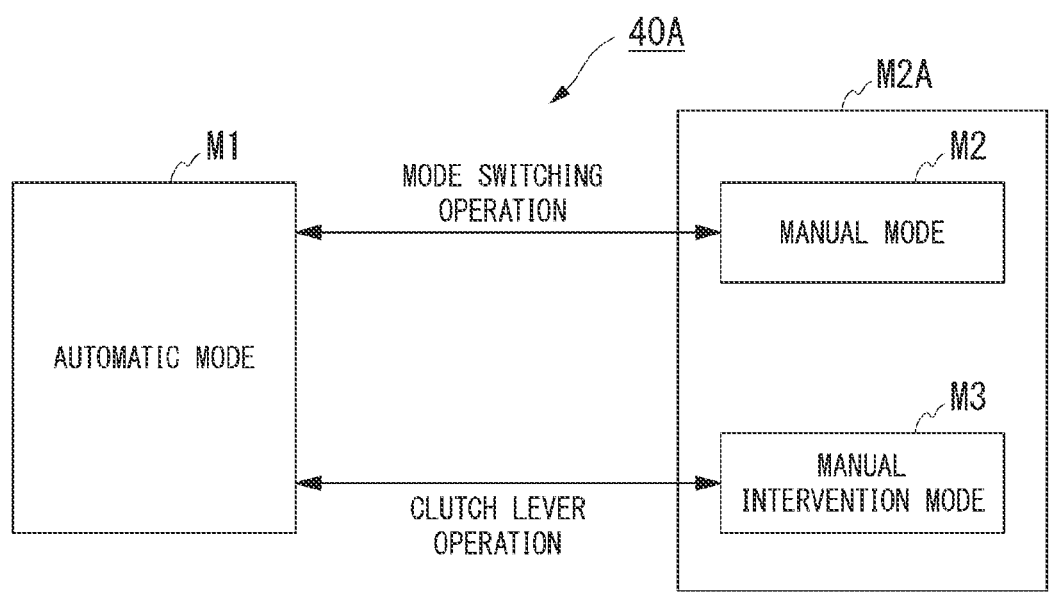
FIG. 4 is a diagram which describes a transition of a clutch control mode of the motorcycle.

As shown in FIG. 4, a clutch control device 40A of the present embodiment has three types of clutch control modes. The clutch control modes have an automatic mode M1 in which automatic control is performed, a manual mode M2 in which a manual operation is performed, and a manual intervention mode M3 in which a temporary manual operation is performed. The clutch control modes appropriately transition among the three types of modes according to an operation of a clutch control mode changeover switch 49 (refer to FIG. 3) and the clutch operator. A subject including the manual mode M2 and the manual intervention mode M3 is referred to as a manual system M2A.

The automatic mode M1 is a mode in which the clutch device 26 is controlled by calculating a clutch capacity suitable for a traveling state according to an automatic start and transmission control. The manual mode M2 is a mode in which the clutch device 26 is controlled by calculating the clutch capacity according to a clutch operation instruction from the occupant. The manual intervention mode M3 is a mode in which the clutch operation instruction from the occupant is received in the automatic mode M1, the clutch capacity is calculated based on the clutch operation instruction, and the clutch device 26 is controlled, and is a temporary manual operation mode. Note that, for example, if a state in which the occupant has stopped operating the clutch operator (a completely released state) continues for a specified period of time in the manual intervention mode M3, it may be set to return to the automatic mode M1.

For example, the clutch control device 40A starts control from a clutch-on state (the connected state) in the automatic mode M1 when the system is started. In addition, the clutch control device 40A is set to return to the clutch-on state in the automatic mode M1 when the engine 13 is stopped (when the system is turned off). In the normally closed clutch device 26, there is no power supply to the motor 52 of the clutch actuator 50 when the clutch is turned on. On the other hand, in a clutch-off state (the disconnected state) of the clutch device 26, the power supply to the motor 52 is held.

The automatic mode M1 basically performs clutch control automatically. The automatic mode M1 enables the motorcycle 1 to travel without a lever operation. In the automatic mode M1, a clutch capacity is controlled based on a throttle opening, an engine speed, a vehicle speed, a shift sensor output, and the like. As a result, the motorcycle 1 can be started without an engine stall (meaning an engine stop or an engine stall) only with a throttle operation. In addition, the motorcycle 1 can be gear shifted only by a shift operation. Moreover, in the automatic mode M1, it switches to the manual intervention mode M3 when the occupant grips the clutch lever. This allows the clutch device 26 to be turned off arbitrarily.

On the other hand, in the manual mode M2, the clutch capacity can be controlled (that is, the clutch device 26 can be connected or disconnected) by a lever operation by the occupation. The automatic mode M1 and the manual mode M2 are mutually switchable. This switching is performed by, for example, operating the clutch control mode changeover switch 49 (refer to FIG. 3) while the motorcycle 1 is stopped and the transmission 21 is in neutral. In addition, the clutch control device 40A may include an indicator which shows that it is in the manual state at a time of its transition to the manual system M2A (the manual mode M2 or the manual intervention mode M3).

In the manual mode M2, the clutch control is basically performed manually. In the manual mode M2, the clutch capacity can be controlled according to an operating angle of the clutch lever (also, an operating angle of the driven clutch lever 54). This makes it possible to control the connection or disconnection of the clutch device 26 as the occupant intends. Even in the manual mode M2, when a shift operation is performed without a clutch operation, clutch control can automatically intervene. The operating angle of the driven clutch lever 54 is hereinafter referred to as a driven clutch lever operating angle.

In the automatic mode M1, the clutch actuator 50 automatically connects or disconnects the clutch device 26. At this time, a manual clutch operation is performed on the clutch lever, and thereby a manual operation can be temporarily intervened in automatic control of the clutch device 26 (the manual intervention mode M3).

<Manual Clutch Operation>

In the motorcycle 1 shown in FIG. 1, a clutch lever (not shown) as a clutch manual operator is attached to a base end side (inside in the vehicle width direction) of a left grip of the steering handle 4a.

Also, referring to FIG. 2, the clutch lever is connected to the driven clutch lever 54 attached to the release shaft 53 of the clutch device 26 via an operation cable (not shown). The driven clutch lever 54 is attached to an upper end portion of the release shaft 53 protruding from an upper portion of the right cover 17a so as to be integrally rotatable.

In addition, a handle switch attached to the steering handle 4a is provided with, for example, the clutch control mode changeover switch 49. As a result, the occupant can easily switch the clutch control mode during a normal operation.

<Clutch Actuator>

As shown in FIG. 1, the clutch actuator 50 is attached to a rear upper portion of the right cover 17a on a right side of the crankcase 15.

Referring also to FIGS. 5 and 6, the clutch actuator 50 includes a motor 52 and a deceleration mechanism 51.

The motor 52 is, for example, a DC motor, and is, for example, disposed with its axial direction parallel to that of the release shaft 53. The motor 52 is disposed to protrude a driving shaft 55 upward. The deceleration mechanism 51 transfers the drive force of the motor 52 to the release shaft 53.

In the embodiment, a plurality of (two) motors 52 are provided for a single clutch actuator 50. In the following description, a motor 52 positioned on a vehicle front side of the clutch actuator 50 is referred to as a first motor 521, and a motor 52 positioned on a vehicle rear side and an inner side in the vehicle width direction with respect to the first motor 521 is referred to as a second motor 522. Lines C01 and C02 in the drawings indicate central axes (driving axes) of the motors 521 and 522, respectively. Both the motors 521 and 522 may be collectively referred to as the motor 52 for convenience of explanation. In addition, both axes C01 and C02 may be collectively referred to as an axis C0. Control of a plurality (two) of motors 52 will be described below.

The deceleration mechanism 51 decelerates the rotational power output from the motor 52 and transfers it to the release shaft 53. The deceleration mechanism 51 includes, for example, a gear train whose axial direction is parallel to that of the release shaft 53. The deceleration mechanism 51 includes a driving gear 55a, a first reduction gear 57a, a first small-diameter gear 57b, a second reduction gear 58a, a second small-diameter gear 58b, a driven gear 63a, and a gear case 59.

The driving gear 55a is provided integrally with the driving shaft 55 of each motor 521 or 522. Each driving gear 55a meshes with the first reduction gear 57a. The first small-diameter gear 57b is provided coaxially with the first reduction gear 57a. The second reduction gear 58a meshes with the first small-diameter gear 57b. The second small-diameter gear 58b is provided coaxially with the second reduction gear 58a. The driven gear 63a meshes with the second small-diameter gear 58b. A gear case 59 accommodates each gear.

The first reduction gear 57a and the first small-diameter gear 57b are rotatably supported by a first support shaft 57c. The first reduction gear 57a, the first small-diameter gear 57b, and the first support shaft 57c constitute a first reduction shaft 57. The second reduction gear 58a and the second small-diameter gear 58b are rotatably supported by a second support shaft 58c. The second reduction gear 58a, the second small-diameter gear 58b, and the second support shaft 58c constitute a second reduction shaft 58. The first support shaft 57c and the second support shaft 58c are rotatably supported by the gear case 59, respectively. The second reduction gear 58a is a sector gear centered on the second support shaft 58c. The second reduction gear 58a is provided so as to extend forward and outward in the vehicle width direction of the second support shaft 58c. In the drawings, a line C1 indicates a central axis of the first reduction shaft 57, and a line C2 indicates a central axis of the second reduction shaft 58, respectively.

The driven gear 63a is provided on the release shaft 53 so as to be integrally rotatable. The driven gear 63a is a sector gear centered on the release shaft 53. The driven gear 63a is provided so as to spread in front of the release shaft 53. A downstream gear in the deceleration mechanism 51 has a small rotation angle. For this reason, the second reduction gear 58a and the driven gear 63a can be sector gears with a small rotation angle.

As a result, the deceleration mechanism 51 and thus the clutch actuator 50 can be decreased in size. That is, even when a large-diameter deceleration gear is provided to increase a deceleration ratio, the following effects can be obtained by cutting out portions other than a meshing range of this reduction gear to form a fan shape. That is, in particular, it is possible to suppress the deceleration mechanism 51 from projecting outward in the vehicle width direction, and it is possible to reduce a weight of the deceleration mechanism 51.

With this configuration, the motor 52 and the release shaft 53 can always be interlocked via the deceleration mechanism 51. As a result, a system in which the clutch actuator 50 directly connects or disconnects the clutch device 26 is configured.

Each gear is a flat spur gear with reduced thickness in the axial direction, and the gear case 59 is also formed in a flat shape with reduced thickness in the axial direction. As a result, the deceleration mechanism 51 becomes difficult to stand out when viewed from the side of the vehicle. The first rotation angle sensor 57d and the second rotation angle sensor 58d are provided on a top side of the gear case 59.

The first rotation angle sensor 57d and the second rotation angle sensor 58d are connected to one end of each of the first reduction shaft 57 and the second reduction shaft 58 to detect rotation angles of these shafts.

The motor 52 is disposed to protrude downward from a front of the gear case 59. As a result, the motor 52 can be disposed as follows. That is, it can be disposed while avoiding a bulging portion 17b covering the clutch device 26 in the right cover 17a forward. For this reason, the protrusion of the clutch actuator 50 outward in the vehicle width direction is suppressed.

The drive force of the motor 52 is decelerated as follows and transferred to the release shaft 53. That is, the drive force of the motor 52 is reduced between the driving gear 55a and the first reduction gear 57a, reduced between the first small-diameter gear 57b and the second reduction gear 58a, and further reduced between the second small-diameter gear 58b and the driven gear 63a.

In the embodiment, a stopper 59a is provided before a final stage of the gear train of the deceleration mechanism 51 (between the second small-diameter gear 58b and the driven gear 63a). The stopper 59a defines an initial position of the release shaft 53 (a stop position in a returning direction opposite to the clutch disconnected direction). The stopper 59a is, for example, integrally formed inside the gear case 59. The stopper 59a defines the stop position of the second reduction gear 58a by bring a side edge of the fan-shaped second reduction gear 58a in contact therewith. By providing the stopper 59a at a stage where the torque is smaller than that at the final stage of the deceleration mechanism 51, the following effects are obtained. That is, the initial position of the release shaft 53 can be reliably defined after a strength of the gear case 59 is suppressed. In addition, it is possible to prevent an excessive load from being input to the final stage where the torque is the largest due to deceleration, and the gear can be decreased in size and weight.

<Disposition of Clutch Actuator>

Figure 15:
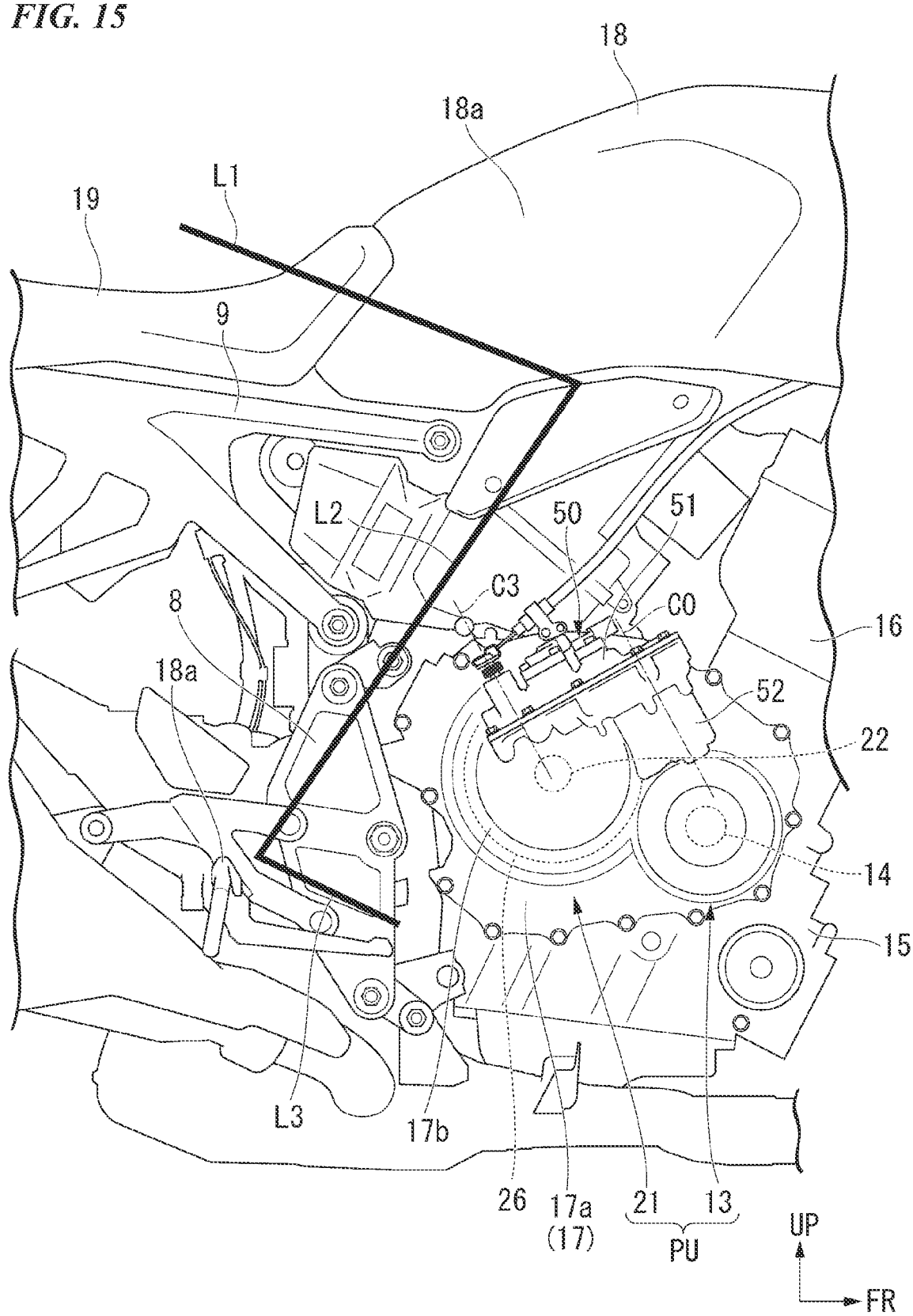
FIG. 15 is a right-side view which shows a main part of the motorcycle described above.
Figure 16:
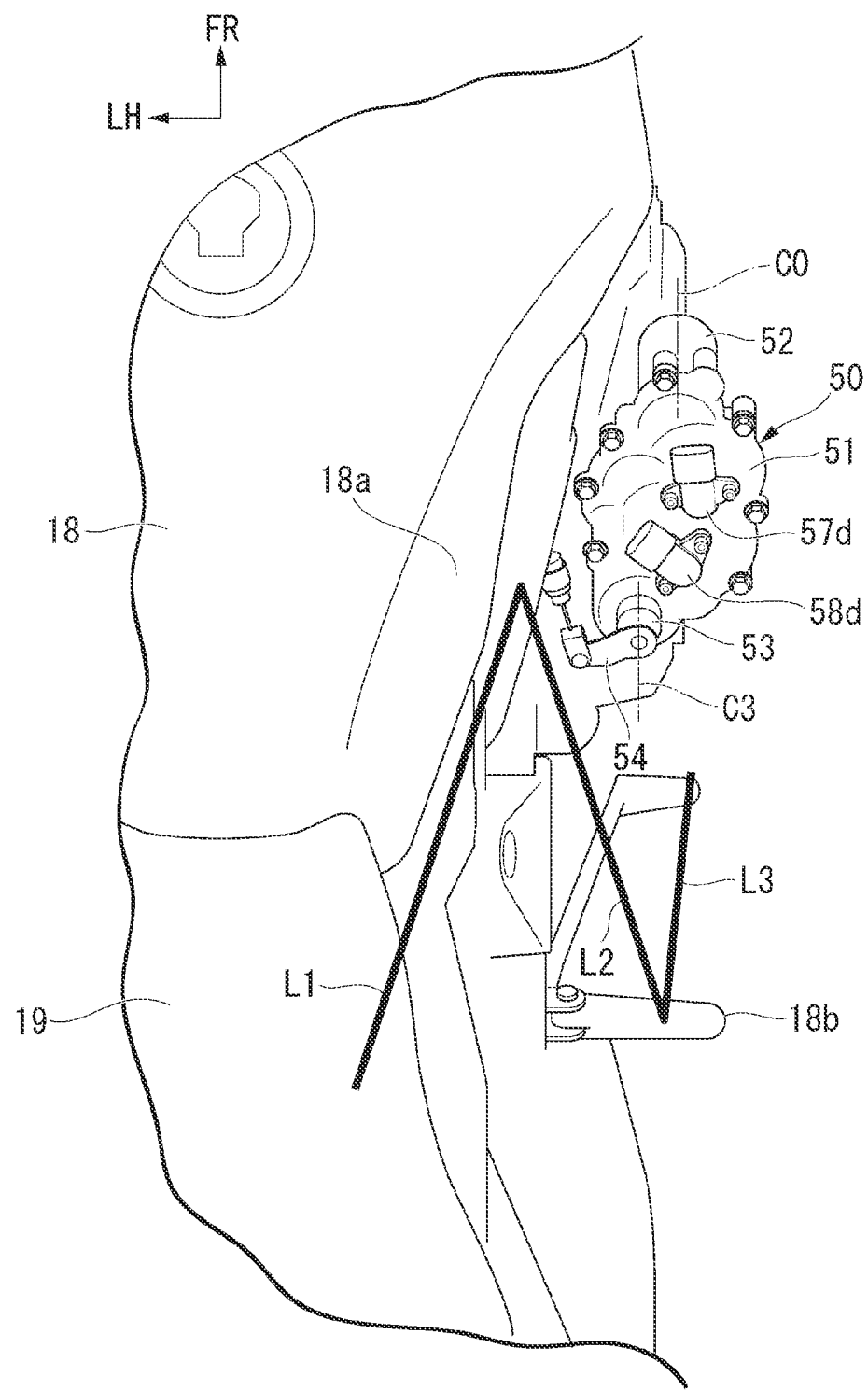
FIG. 16 is a top view which shows the main part of the motorcycle described above.
Figure 17:
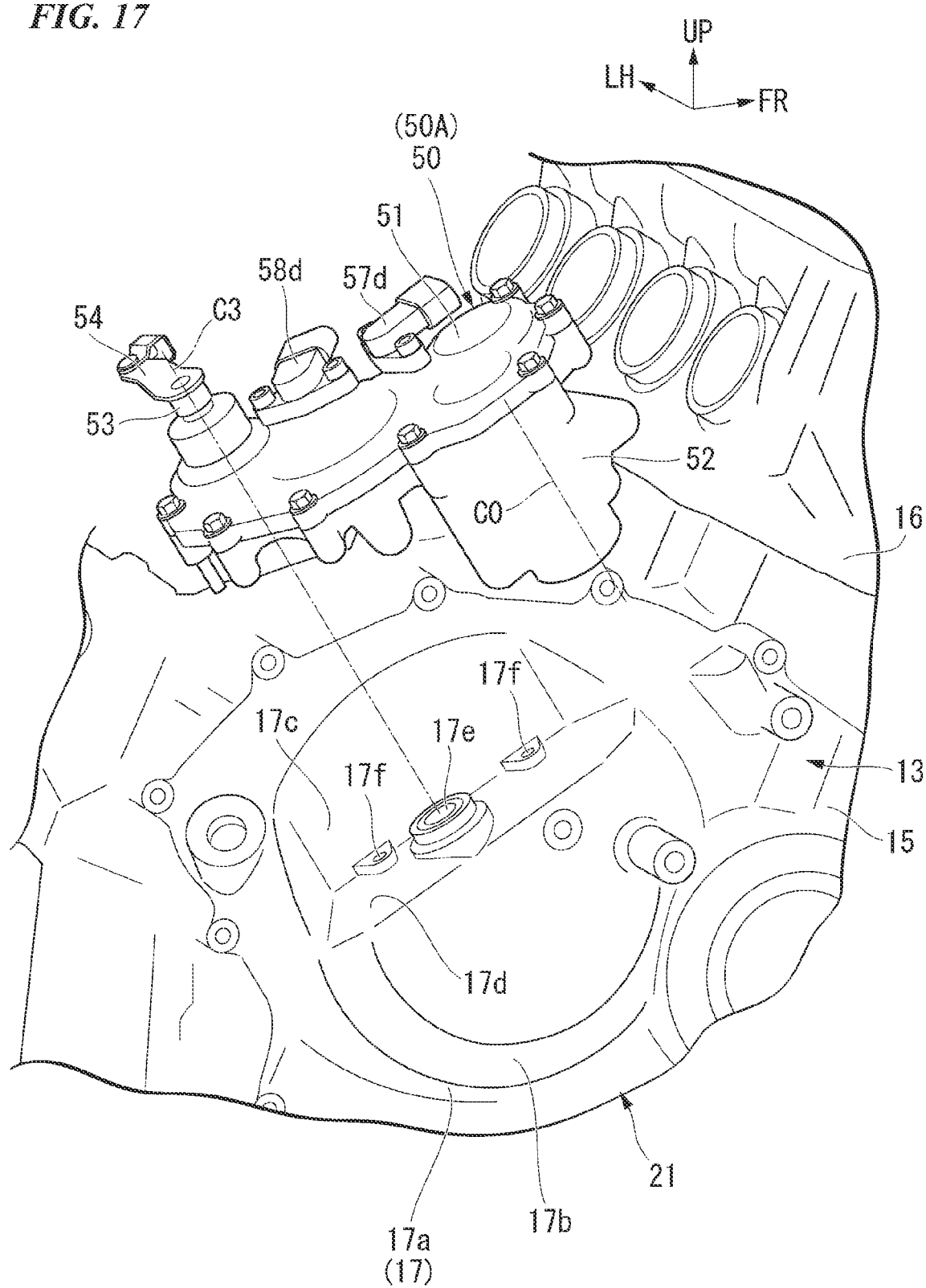
FIG. 17 is an exploded perspective view which shows the main part of the motorcycle described above.

As shown in FIGS. 15 to 17, the clutch actuator 50 is disposed vertically below the knee grip portion 18a on a right side of the fuel tank 18 when viewed from the side of the vehicle. The clutch actuator 50 is disposed to protrude outward in the vehicle width direction from the knee grip portion 18a on the right side of the fuel tank 18 when viewed from the top of the vehicle in FIG. 16. In the drawings, a line L1 represents the thigh of the driver's leg, a line L2 represents the lower leg below the knee, and a line L3 represents the foot from the ankle.

As for the driver's legs, when viewed from the side of the vehicle, the lower leg L2 extends obliquely downward and rearward from the knee grip portion 18a, and the foot L3 is placed on the step 18b. The clutch actuator 50 projects outward in the vehicle width direction from the knee grip portion 18a. The clutch actuator 50 is disposed while avoiding the lower leg L2 of the driver's legs forward when viewed from the side of the vehicle. As a result, interference of the clutch actuator 50 with respect to a disposition space of the driver's legs is suppressed. The clutch actuator 50 is disposed while avoiding the lower leg L2 of the driver's legs forward when viewed from the side of the vehicle even when the driver extends the leg and lands the foot L3. Even in this respect, the interference of the clutch actuator 50 with respect to the disposition space of the driver's legs is suppressed.

Referring to FIG. 17, the right cover 17a has the following range as the bulging portion 17b that bulges outward in the vehicle width direction. The range is a circular range coaxial with the clutch device 26 when viewed from the side of the vehicle. A cover recess portion 17c is formed at a portion of the bulging portion 17b facing rearward and upward. The cover recess portion 17c changes the outer surface inward in the vehicle width direction with respect to the remaining portion. The cover recess portion 17c has a semicircular shape when viewed from the side of the vehicle.

A semicircular chord portion of the cover recess portion 17c is formed in a straight-line shape orthogonal to an axial direction of the release shaft 53 when viewed from the side of the vehicle. This chord portion forms a stepped portion 17d that changes an outer surface of the bulging portion 17b to be in a stepped shape. The stepped portion 17d is inclined rearwardly downward when viewed from the side of the vehicle. An upper portion of the release shaft 53 protrudes obliquely upward and rearward from the stepped portion 17d. The release shaft 53 penetrates the stepped portion 17d of the cover recess portion 17c and protrudes to an outside of the cover. The clutch actuator 50 is attached to the right cover 17a while being disposed to enter the cover recess portion 17c.

<Release Shaft>

Figure 7:
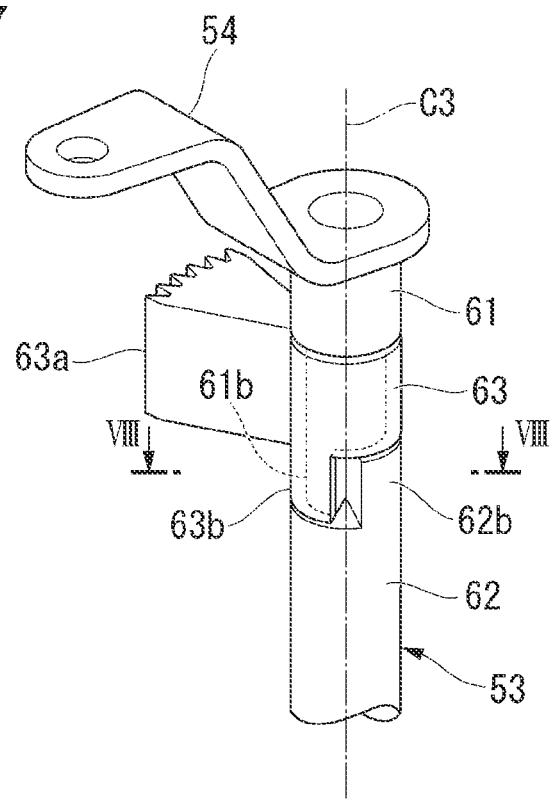
FIG. 7 is a perspective view of a release shaft that actuates a clutch device.
Figure 8:
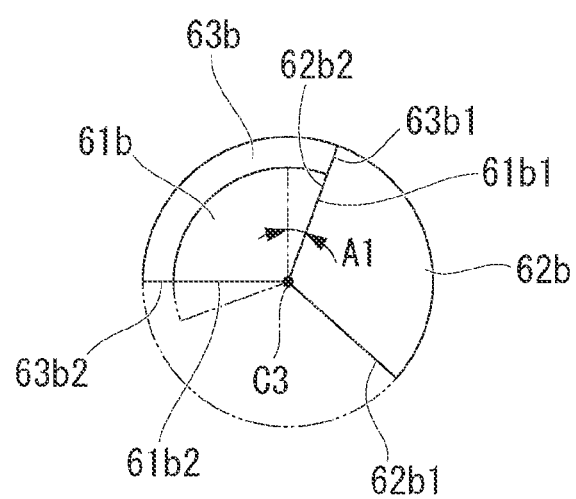
FIG. 8 is a sectional view along line VIII-VIII in FIG. 7.

As shown in FIGS. 6 to 8, the release shaft 53 is divided into a plurality of elements such that each can individually receive an input from the clutch actuator 50 and an input from an operation of the occupant and be rotatable.

The release shaft 53 has an upper release shaft 61 constituting the upper portion, a lower release shaft 62 constituting the lower portion, and an intermediate release shaft 63. The intermediate release shaft 63 is disposed across a lower end portion of the upper release shaft 61 and an upper end portion of the lower release shaft 62.

The upper release shaft 61 has a cylindrical shape. The upper release shaft 61 is rotatably supported by an upper boss portion 59b of the gear case 59. An upper end portion of the upper release shaft 61 protrudes outward the gear case 59. The driven clutch lever 54 is supported on the upper end portion of the upper release shaft 61 to be integrally rotatable. A return spring 54s is attached to the driven clutch lever 54. The return spring 54s applies a biasing force to the driven clutch lever 54 in a direction opposite to a rotation (a rotation in a clutch disconnected direction) by the operation of the clutch operator.

The lower release shaft 62 has a cylindrical shape. A lower portion of the lower release shaft 62 is rotatably supported inside the right cover 17a. The lower portion of the lower release shaft 62 faces inside the gear case 59. The eccentric cam portion 38a of the release mechanism 38 is formed at the lower portion. A lower return spring 62s is attached to a lower end portion of the lower release shaft 62. The lower return spring 62s applies a biasing force to the lower release shaft 62 in a direction opposite to the rotation in the clutch disconnected direction.

The lower end portion of the upper release shaft 61 is provided with a manual operation side cam 61b extending in the axial direction with a fan-shaped section.

The upper end portion of the lower release shaft 62 is provided with a clutch side cam 62b extending in the axial direction with a fan-shaped section. The clutch side cam 62b is provided in a range avoiding the manual operation side cam 61b in the circumferential direction or the axial direction.

The lower end portion (the manual operation side cam 61b) of the upper release shaft 61 and the upper end portion (the clutch side cam 62b) of the lower release shaft 62 overlap each other in the axial direction while avoiding each other in the circumferential direction. Alternatively, the manual operation side cam 61b and the clutch side cam 62b overlap each other in the circumferential direction while avoiding each other in the axial direction. As a result, it is possible to press the other circumferential side surface 62b2 of the clutch side cam 62b to rotate the lower release shaft 62 (refer to FIGS. 9B and 10B) on one circumferential side surface 61b1 of the manual operation side cam 61b.

The other circumferential side surface 61b2 of the manual operation side cam 61b and the one circumferential side surface 62b1 of the clutch side cam 62b are separated from each other in the circumferential direction or the axial direction. As a result, when there is an input from the clutch actuator 50 to the clutch side cam 62b, the lower release shaft 62 can rotate independently from the upper release shaft 61 (refer to FIGS. 9A and 10A).

The intermediate release shaft 63 has a cylindrical shape. The intermediate release shaft 63 enables engagement portions (upper and lower shaft engagement portions) of the lower end portion of the upper release shaft 61 and the upper end portion of the lower release shaft 62 to pass therethrough. A driven gear 63a is supported on the intermediate release shaft 63 so as to be integrally rotatable.

The intermediate release shaft 63 is provided with a control operation side cam 63b extending in the axial direction with a fan-shaped section.

The intermediate release shaft 63 and driven gear 63a suppress contact with other components of the clutch actuator 50. Specifically, the intermediate release shaft 63 only bring the inner circumference in contact with the following portions other than a bearing supported by the gear case 59. The portions are the lower end portion (manual operation side cam 61b) of the upper release shaft 61 and the upper end portion (the clutch side cam 62b) of the lower release shaft 62.

The control operation side cam 63b of the intermediate release shaft 63 is engaged with the following portions with a clearance provided in the axial direction. These portions are the manual operation side cam 61b of the upper release shaft 61 and the clutch side cam 62b of the lower release shaft 62.

In addition, the driven gear 63a only brings gear teeth in contact with the second small-diameter gear 58b. As a result, friction of the driven gear 63a, which is a control gear, is reduced as much as possible, and a control accuracy of the release shaft 53 is improved.

The control operation side cam 63b of the intermediate release shaft 63 and the clutch side cam 62b of the lower release shaft 62 overlap each other in the axial direction while avoiding each other in the circumferential direction. Alternatively, the control operation side cam 63b and the clutch side cam 62b overlap each other in the circumferential direction while avoiding each other in the axial direction. As a result, it is possible to press the other circumferential side surface 62b2 of the clutch side cam 62b and to rotate the lower release shaft 62 on one circumferential side surface 63b1 of the control operation side cam 63b.

In addition, the control operation side cam 63b is disposed while avoiding the manual operation side cam 61b of the upper release shaft 61 in the axial direction or a radial direction. As a result, the lower release shaft 62 can be rotated independently from the upper release shaft 61 when an input from the clutch actuator 50 is transferred to the clutch side cam 62b. Moreover, when there is a manual operation, the upper release shaft 61 can be rotated independently from the intermediate release shaft 63 on a control side.

The other circumferential side surface 63b2 of the control operation side cam 63b and the one circumferential side surface 62b1 of the clutch side cam 62b are separated from each other in the circumferential direction. As a result, the lower release shaft 62 can rotate independently from the intermediate release shaft 63 when there is an input from the manual operation side cam 63b in the clutch side cam 62b.

With reference to FIGS. 11 and 17, the clutch actuator 50 rotatably holds the upper release shaft 61 and the intermediate release shaft 63 with the gear case 59. The clutch actuator 50 includes an upper release shaft 61 and an intermediate release shaft 63 to form an integral actuator unit 50A.

The lower release shaft 62 is rotatably held by the right cover 17a. An opening portion 17e and a fastening portion 17f of the gear case 59 are provided on the stepped portion 17d of the cover recess portion 17c of the right cover 17a. From the opening portion 17e, the upper end portion of the lower release shaft 62 protrudes. An opening portion 59c is provided at a portion of the gear case 59 facing the stepped portion 17d of the cover recess portion 17c. The opening portion 59c faces the upper end portion of the lower release shaft 62 inside the gear case 59.

In this configuration, when the actuator unit 50A is attached to the right cover 17a, a linear release shaft 53 is configured. The release shaft 53 is configured by connecting the upper release shaft 61, the intermediate release shaft 63, and the lower release shaft 62 to each other.

A power unit PU of the embodiment can be configured as follows with respect to a power unit of a manual clutch type in which the connection or disconnection operation of the clutch device 26 is not performed by electrical control but by an operation of the driver. That is, the power unit PU can be configured by exchanging the right cover 17a and the release shaft 53 and retrofitting the actuator unit 50A. For this reason, the actuator unit 50A can be attached to the power unit of a different model. For this reason, a semi-automatic transmission system (automatic clutch type transmission system) can be easily configured by sharing the actuator unit 50A among many models.

<Clutch Control>

Figure 12:
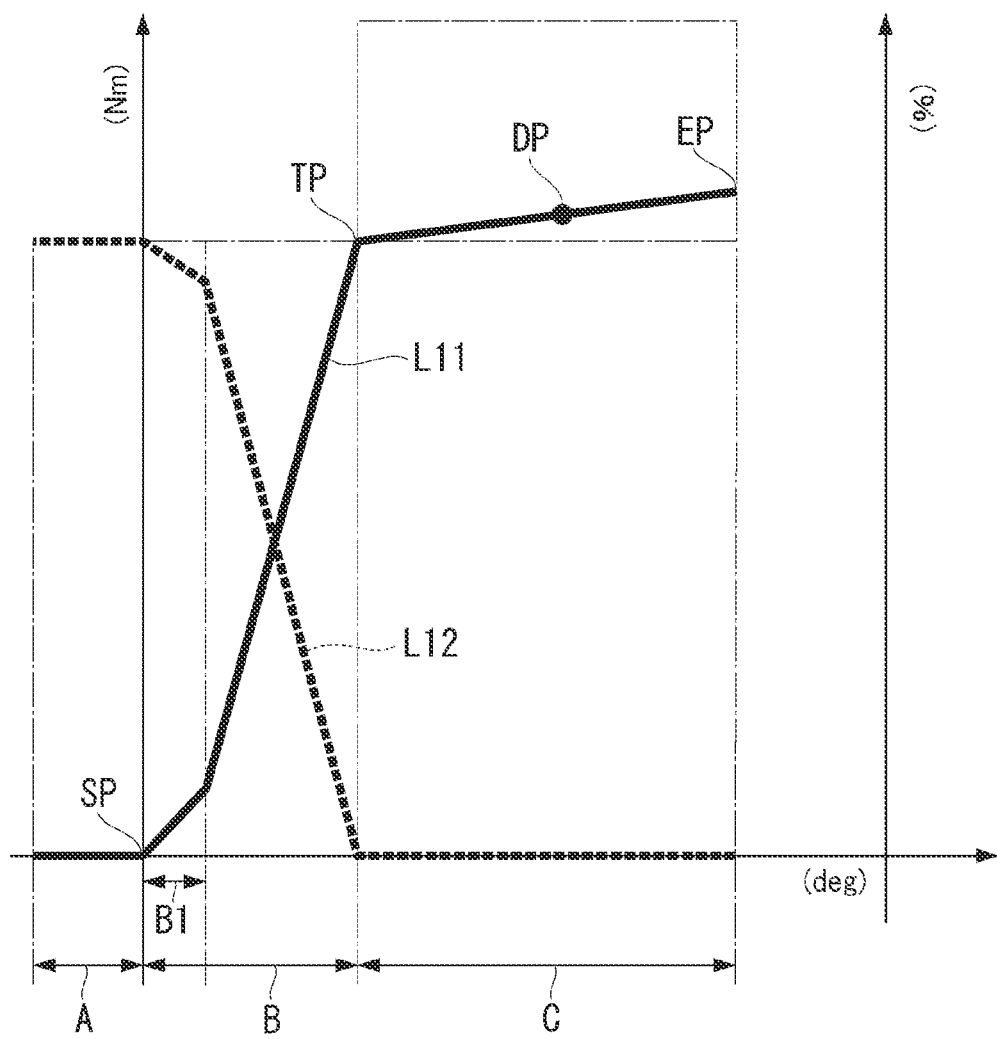
FIG. 12 is a graph which shows clutch control characteristics, where the vertical axis indicates an output value of the clutch actuator and the horizontal axis indicates an amount of operation of a release mechanism.

Next, the clutch control of the embodiment will be described with reference to a graph of FIG. 12. The graph of FIG. 12 represents clutch characteristics in the automatic mode M1. In the graph of FIG. 12, the vertical axis indicates a torque (Nm) and a clutch capacity (%) applied to the driven clutch lever 54, and the horizontal axis indicates an operating angle (deg) of the driven clutch lever 54, respectively. The operating angle of the driven clutch lever 54 is an operating angle of the lower release shaft 62.

A torque of the driven clutch lever 54 is a generated torque of the lower release shaft 62. This torque corresponds to a torque value calculated by multiplying the following primary torque value by a reduction ratio of the deceleration mechanism 51. The primary torque value is obtained based on a current value supplied to the motor 52 from correlation between a current to be supplied to the motor 52 and a torque generated by the motor 52.

In the following description, the torque of the driven clutch lever 54 is referred to as a driven clutch lever torque. Correlation between the driven clutch lever operating angle and the driven clutch lever torque is indicated by a line L11 in the graph. The correlation between the driven clutch lever operating angle and the clutch capacity is indicated by a line L12 in the graph. The line L11 may also be a line indicating an output value (a reference output value) of the clutch actuator 50 when the clutch device 26 is connected or disconnected without intervention of a manual operation.

In the automatic mode M1 of the normally closed clutch, when the driven clutch lever torque (motor output) is "0," there is no operation input (input to a cut side) to the clutch device 26 and the clutch capacity is 100%. That is, the clutch device 26 maintains the connected state. This state corresponds to a region A on the horizontal axis of FIG. 12. The region A is a play region of the driven clutch lever 54. In the region A, there is no motor output and the driven clutch lever torque transitions to "0." In the region A, there is no operation of the clutch device 26 and the clutch capacity transitions to 100%.

Also referring to FIG. 8, in the region A, the one circumferential side surface 61b1 of the manual operation side cam 61b of the release shaft 53 does not press the other circumferential side surface 62b2 of the clutch side cam 62b. At this time, the manual operation side cam 61b is separated from the clutch side cam 62b by a biasing force of the return spring 54s (indicated by a dashed line in FIG. 8). In the region A, the driven clutch lever 54 is in a play state in which the manual operation side cam 61b can move toward and away from the clutch side cam 62b by an angle μl in the figure. For example, in the region A, one circumferential side surface 63b1 of the control operation side cam 63b is in contact with the other circumferential side surface 62b2 of the clutch side cam 62b.

Referring to FIG. 12, when the driven clutch lever operating angle increases past the play region A, the driven clutch lever operating angle shifts to a half-clutch region B. In the half-clutch region B, an operation of the motor 52 causes the driven clutch lever torque to start increasing.

Figure 9:
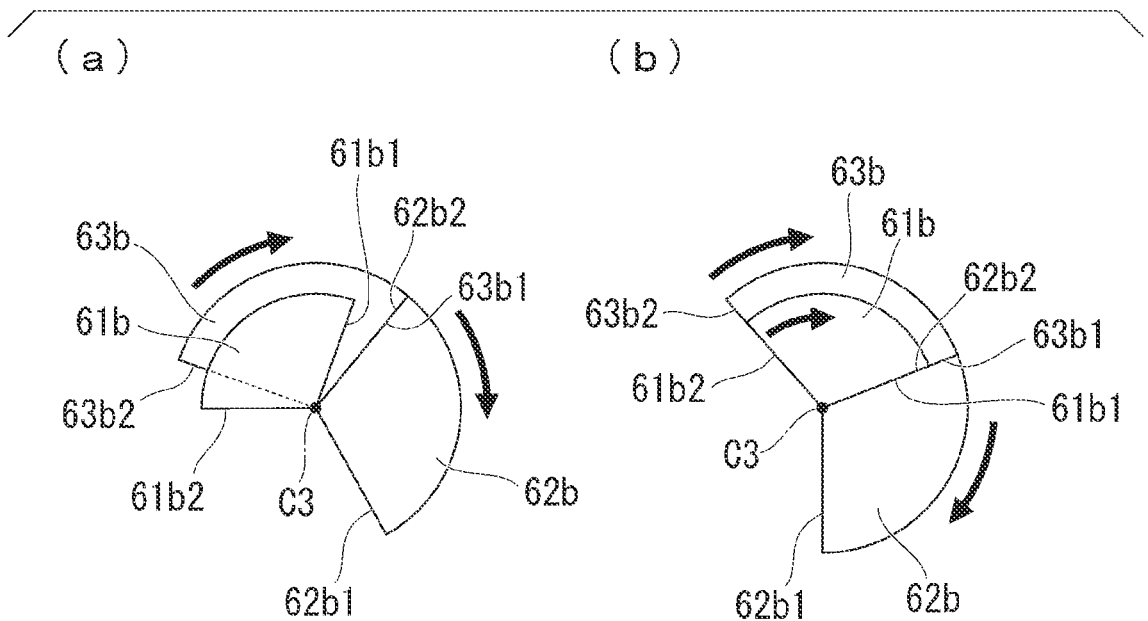
FIG. 9A is a sectional view corresponding to FIG. 8 which shows an action of the release shaft in a half-clutch region, and shows driving in the clutch actuator.
FIG. 9B is a sectional view corresponding to FIG. 8 which shows the action of the release shaft in a half-clutch region, and shows manual intervention.

Also referring to FIG. 9A, in the half-clutch region B, the control operation side cam 63b presses the clutch side cam 62b to rotate the lower release shaft 62. As the driven clutch lever torque increases, the release mechanism 38 lifts and actuates the clutch device 26 to decrease the clutch capacity. That is, the clutch device 26 is in a semi-clutch state in which a partial power transmission can be performed. A symbol SP in FIG. 12 indicates a start position of an operation of switching the play region A to the half-clutch region B (an operation start position). In the half-clutch region B, if the manual operation intervenes, the manual operation side cam 61b is in contact with the clutch side cam 62b. At this time, the manual operation side cam 61b rotates the lower release shaft 62 in cooperation with the control operation side cam 63b (refer to FIG. 9B).

With reference to FIG. 12, in the half-clutch region B, the driven clutch lever torque sharply increases as the driven clutch lever operating angle increases, and actuates the clutch device 26 to the cutting side. For example, at a beginning of the half-clutch region B, there is an influence of a clutch judder spring reaction force (not shown). As a result, at the beginning of the half-clutch region B, a deceleration region B1 is set in which an increase in the driven clutch lever torque is gradual with respect to an increase in the driven clutch lever operating angle.

In the half-clutch region B, the clutch capacity sharply decreases as the driven clutch lever operating angle increases, like being inversely proportional to an increase in the driven clutch lever torque. In the deceleration region B1 at the beginning of the half-clutch region B, a decrease in the clutch capacity is gradual as an increase in the driven clutch lever torque is gradual.

When the driven clutch lever operating angle passes through a touch point TP, which is an end point of the half-clutch region B, the increase in the driven clutch lever torque becomes more gradual than in the deceleration region B1. A region after the touch point TP in the driven clutch lever operating angle becomes, for example, a clutch disconnected region C in which the clutch capacity transitions to a value equivalent to "0." The clutch disconnected region C is, for example, an operating margin region for operating the driven clutch lever 54 or the like to its mechanical operating limit position. In the clutch disconnected region C, the driven clutch lever torque increases slightly. This increment corresponds to an increment in clutch spring load associated with the movement of lifting parts of the clutch device 26. A sign EP in FIG. 12 indicates a full lift position, which is an end point of the clutch disconnected region C.

For example, a standby position DP is set in the middle of the clutch disconnected region C. At the standby position DP, the following driven clutch lever torque is applied. The driven clutch lever torque at this time is slightly higher than a torque of the touch point TP where the clutch device 26 starts connection. At the touch point TP, some torque transfer may occur due to operating errors. On the other hand, by applying the driven clutch lever torque up to the torque of the standby position DP, a torque transfer of the clutch device 26 is completely blocked. In addition, at the standby position DP, a slightly low driven clutch lever torque is applied with respect to the full lift position EP, so that it is possible to invalidate the clutch device 26. That is, at the standby position DP, it is possible to cancel backlash of each portion of the clutch device 26 and a reaction force of an operation, or the like, and to enhance a responsiveness of an operation when the clutch device 26 is connected.

Furthermore, when the clutch device 26 operates from the connected state to the disconnected side, an operation start position SP and the touch point TP will be determined as follows. That is, a point at which the driven clutch lever torque rises (a starting point of the half-clutch region B) is the operation start position SP. In addition, a point where the clutch device 26 is completely disconnected (an end point of the half-clutch region B) is the touch point TP.

Conversely, when the clutch device 26 operates from the disconnected state to the connected side, the touch point TP and the operation start position SP will be determined as follows. That is, a point where the clutch device 26 starts connecting is the touch point TP. In addition, a point where the clutch device 26 is completely connected is the operation start position SP.

Figure 13:
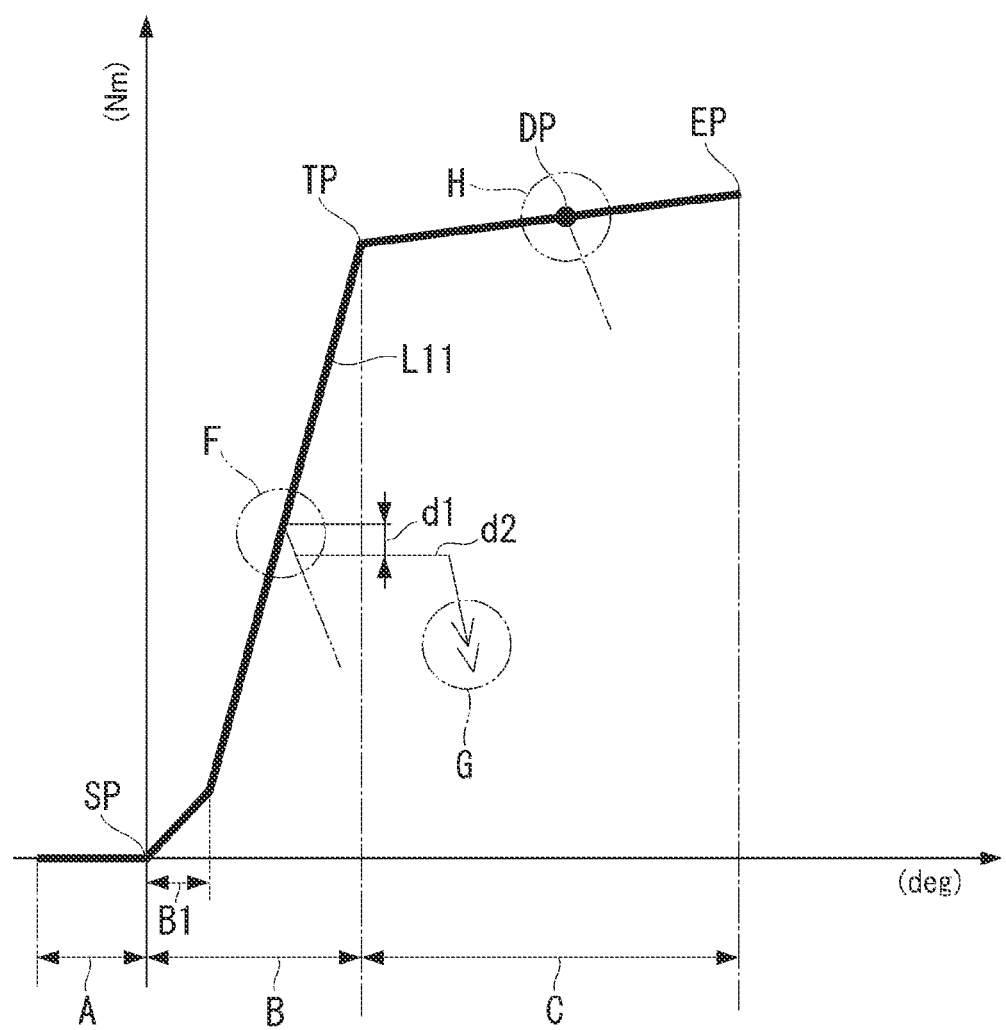
FIG. 13 is a graph corresponding to FIG. 12, and shows a first action of the embodiment.

Referring to FIG. 13, in the half-clutch region B, driving of the motor 52 is controlled based on a lift load.

In such control, first, the clutch spring load is set in advance based on an elastic force of the clutch spring 37. Next, a lift load acting on the clutch device 26 (an operation load against the clutch spring load) is estimated according to the driven clutch lever torque. Then, a load obtained by subtracting the lift load from the clutch spring load is set as the clutch pressing load that is actually caused to act on the clutch device 26.

The clutch capacity is obtained by "the clutch pressing load/the clutch spring load." The power supplied to the motor 52 is controlled so that the clutch capacity reaches a target value, and the driven clutch lever torque and the lift load are controlled. The motor current value and the lever operating angle at each of the operation start position SP and the touch point TP are set to predetermined values in advance. Alternatively, the motor current value and the lever operating angle are set by learning control, such as when power of the motorcycle 1 is turned on or off, as will be described below.

Examples of a sensing constituent include the following constituent. That is, they include a current sensor 40*b* is provided in a motor control device (the clutch control unit 40C), and this detected value is converted into a motor torque and further converted into a driven clutch lever torque (a clutch operation torque).

As shown in FIG. 13, in the half-clutch region B, when there is intervention of an operation (a manual operation) of the clutch lever, the following actions will occur. That is, a measured value of the driven clutch lever torque decreases with respect to the correlation line L11 of the driven clutch lever torque set in advance (refer to a portion F in FIG. 13). At this time, when an amount of decrease in the driven clutch lever torque exceeds a predetermined threshold value d1, it is determined that there has been the intervention of a manual operation, and the control shifts to predetermined manual operation intervention control.

In the manual operation intervention control, for example, after the intervention of a manual operation is detected, control is performed as follows until an increment of the driven clutch lever operating angle becomes a predetermined angle or more. That is, the motor 52 is feedback-controlled so that a torque d2 after the driven clutch lever torque is reduced by the threshold value d1 is maintained. During current control at this time, a current is limited according to an angle after the touch point TP. For this reason, the motor output becomes substantially 0 in the middle of the current control. Since a load at this time is sufficiently low, it is determined that there has been a manual intervention. As a result, it is possible to prevent uncomfortable feeling due to a sudden loss of torque from the motor 52 after an operation of a clutch lever. After the increment of the driven clutch lever operating angle becomes a specified angle or more, the driven clutch lever torque is gradually decreased (refer to a portion G in FIG. 13). As a result, it is possible to suppress power consumption due to continuous driving of the motor 52 while suppressing the uncomfortable feeling.

In the clutch disconnected region C, the driving of the motor 52 is controlled based on a lever position (angle).

As described above, in the clutch disconnected region C, an increase in driven clutch lever torque associated with a lift of the clutch device 26 is small. For this reason, in the clutch disconnected region C, the power supplied to the motor 52 is controlled based on the driven clutch lever operating angle. As a result, after the touch point TP at which the clutch device 26 starts connection, it is possible to control a cutting amount of the clutch device 26 more finely.

Examples of the sensing constituent include the following constituents. That is, the first reduction shaft 57 and the second reduction shaft 58 are provided with a first rotation angle sensor 57*d* and a second rotation angle sensor 58*d*, respectively. Then, a detected value of each of these sensors is converted into a driven clutch lever operating angle (a clutch operation angle). A pair of the first rotation angle sensor 57*d* and the second rotation angle sensor 58*d* are provided for failure, but only one of these may also be provided.

As shown in FIG. 13, when there is intervention of an operation (a manual operation) of the clutch lever in the clutch disconnected region C, the following actions will occur. That is, the measured value of the driven clutch lever torque decreases with respect to the correlation line L11 of the driven clutch lever torque set in advance (refer to a portion H in FIG. 13).

Figure 10:
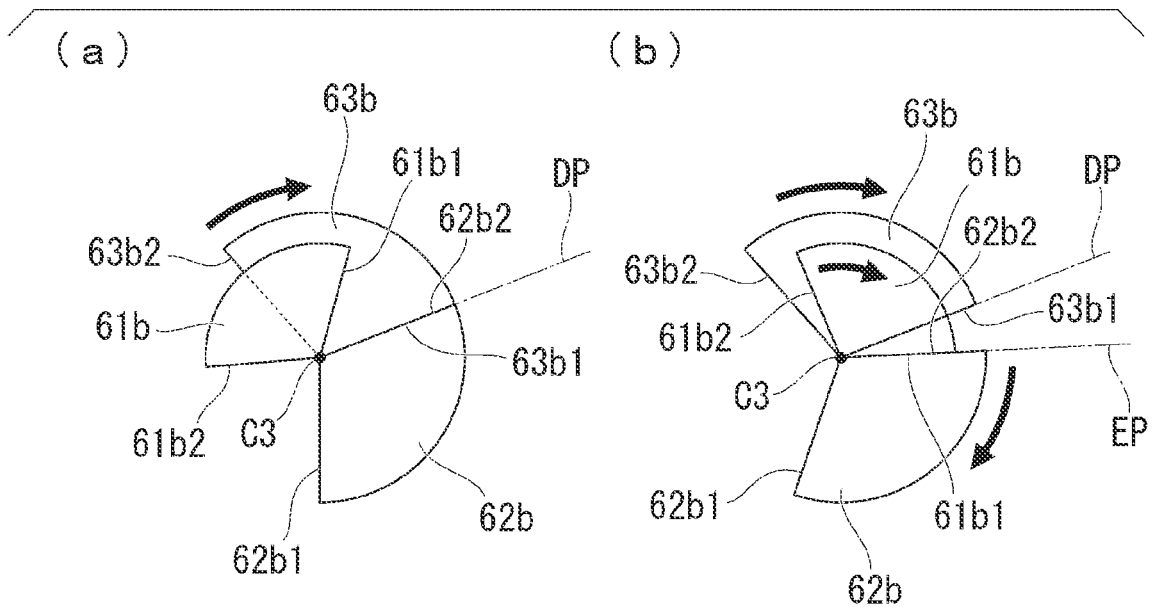
FIG. 10A is a sectional view corresponding to FIG. 8 which shows an action of the release shaft at a standby position, and shows driving in the clutch actuator.
FIG. 10B is a sectional view corresponding to FIG. 8 which shows the action of the release shaft at a standby position, and shows manual intervention.

Also referring to FIG. 10A, for example, in the automatic mode M1, an upper limit of a torque applied to the clutch side cam 62*b* by the control operation side cam 63*b* is a torque up to the standby position DP. The torque until the clutch side cam 62*b* exceeds the standby position DP and reaches the full lift position EP is applied when a manual operation of gripping the clutch lever has intervened. At this time, a torque exceeding the standby position DP is applied from the manual operation side cam 61*b* to the clutch side cam 62*b* (refer to FIG. 10B). At this time, the control operation side cam 63*b* is separated from the clutch side cam 62*b*, and the motor output becomes substantially zero.

Even before the standby position DP is reached, when the driven clutch lever operating angle is in the clutch disconnected region C beyond the touch point TP, the following actions will occur. That is, the measured value of the driven clutch lever torque becomes substantially 0 by the intervention of a manual operation. Therefore, in the clutch disconnected region C, when it has changed to a range in which the measured value of the driven clutch lever torque is substantially 0, it is determined that there has been intervention of a manual operation. Then, the control shifts to the predetermined manual operation intervention control.

In the manual operation intervention control, for example, after the manual operation intervention is detected, control is performed as follows until the increment of the driven clutch lever operating angle is a predetermined angle or more. That is, the motor output is held so that the driven clutch lever operating angle maintains the touch point TP, which is a substantial clutch disconnected position. As a result, an occurrence of an engine stall is suppressed even when the clutch lever is suddenly released after the intervention of a manual operation.

In this manner, finer clutch control (optimal control according to the conditions and characteristics of the clutch device 26) can be performed by selectively using load (current) control and position (angle) control according to conditions of the clutch device 26.

In the embodiment, the driven clutch lever operating angle (a rotation angle of a gear shaft of the deceleration mechanism 51) is detected and controlled as follows. That is, in a region (the half-clutch region B) up to the preset (or learned) touch point TP, control is performed to increase a current value reference. In the region after the touch point TP (the clutch disconnected region C), control is performed to increase an operating angle reference.

Figure 18:
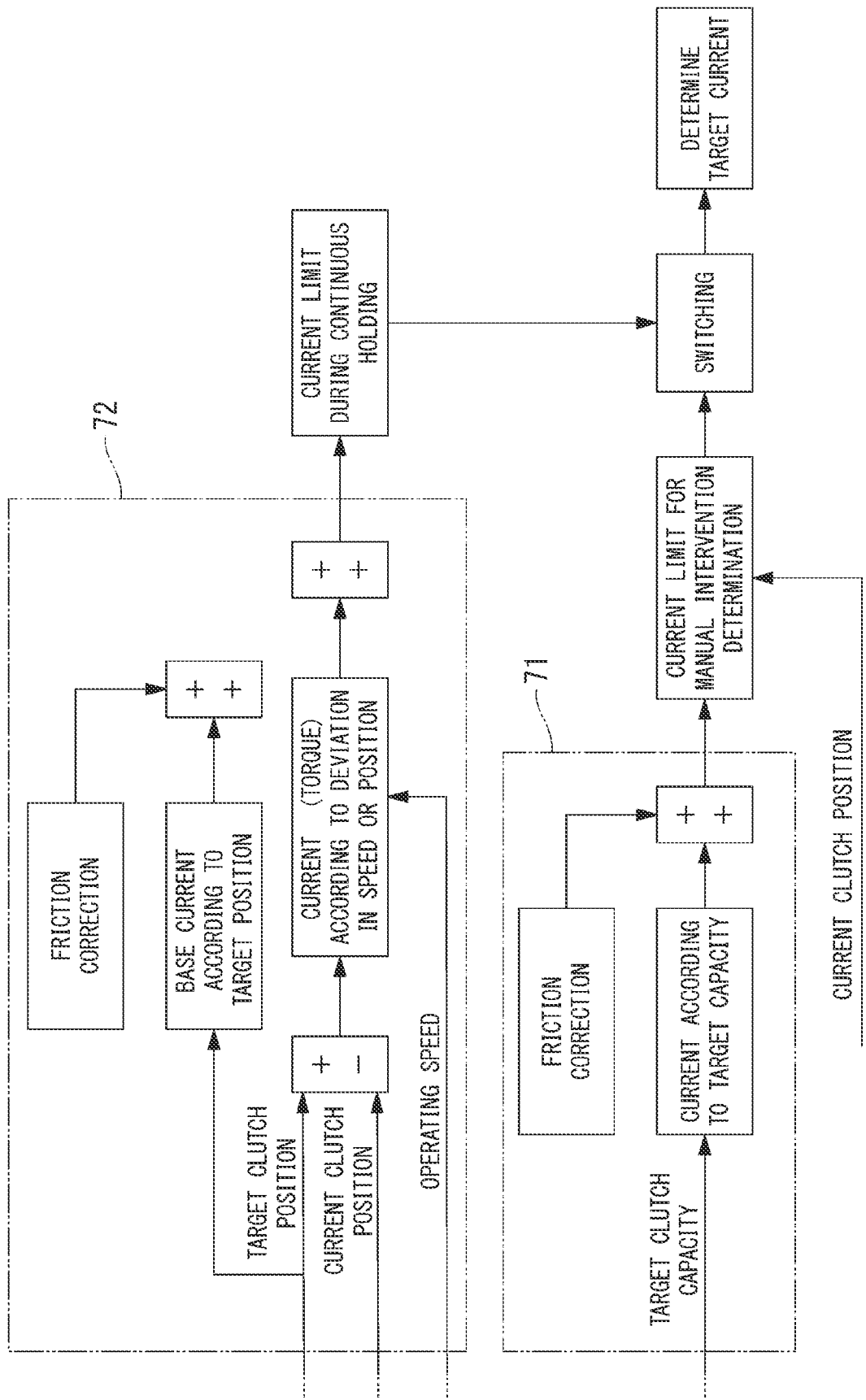
FIG. 18 is a functional block diagram related to target current determination in clutch control.

FIG. 18 is a functional block diagram related to switching control for switching between the half-clutch region B and the clutch disconnected region C in the embodiment.

The block diagram at a lower stage of FIG. 18 shows the following contents as control with increased weighting of a motor current (a clutch capacity, a load) in the half-clutch region B. That is, a target current value is obtained by adding friction correction to a motor current corresponding to a predetermined target clutch capacity. Based on a relationship between this target current value and a current clutch position, the current limit for manual intervention determination is determined. Then, when the clutch position enters the disconnected region during half clutch control, it is determined that there has been manual intervention. A reference numeral 71 in FIG. 18 indicates a first information generation unit that generates information for manual intervention determination based on the clutch capacity (the load) in the half-clutch region B.

A block diagram in an upper stage of FIG. 18 shows the following contents as control with increased weighting of a clutch operating angle (clutch position) in the clutch disconnected region C. That is, "a current value (a torque) according to a deviation in the speed or position" is obtained by further considering a clutch operating speed for a difference between a target clutch position and a current clutch position. In parallel with this, the target current value is obtained by adding friction correction to a base current predetermined according to the target clutch position. By adding this target current value and the current value according to the deviation, the current limit during continuous holding is determined. Then, when the load current drops below a certain value during clutch disconnection control, it is determined that there has been manual intervention. A reference numeral 72 in FIG. 18 indicates a second information generation unit that generates information for manual intervention determination based on the clutch position in the clutch disconnected region C.

Moreover, in the embodiment, changes in current value (converted to a torque value) of the motor 52 with respect to the driven clutch lever operating angle are learned (updated) at a predetermined timing. As a result, a target value (a current value) is set according to the conditions of the clutch device 26. Based on this target value and the detected value of the current sensor 40*b* of the clutch control unit 40C, the driving of the motor 52 is feedback-controlled.

<Correction of Control Reference Value>

Figure 14:
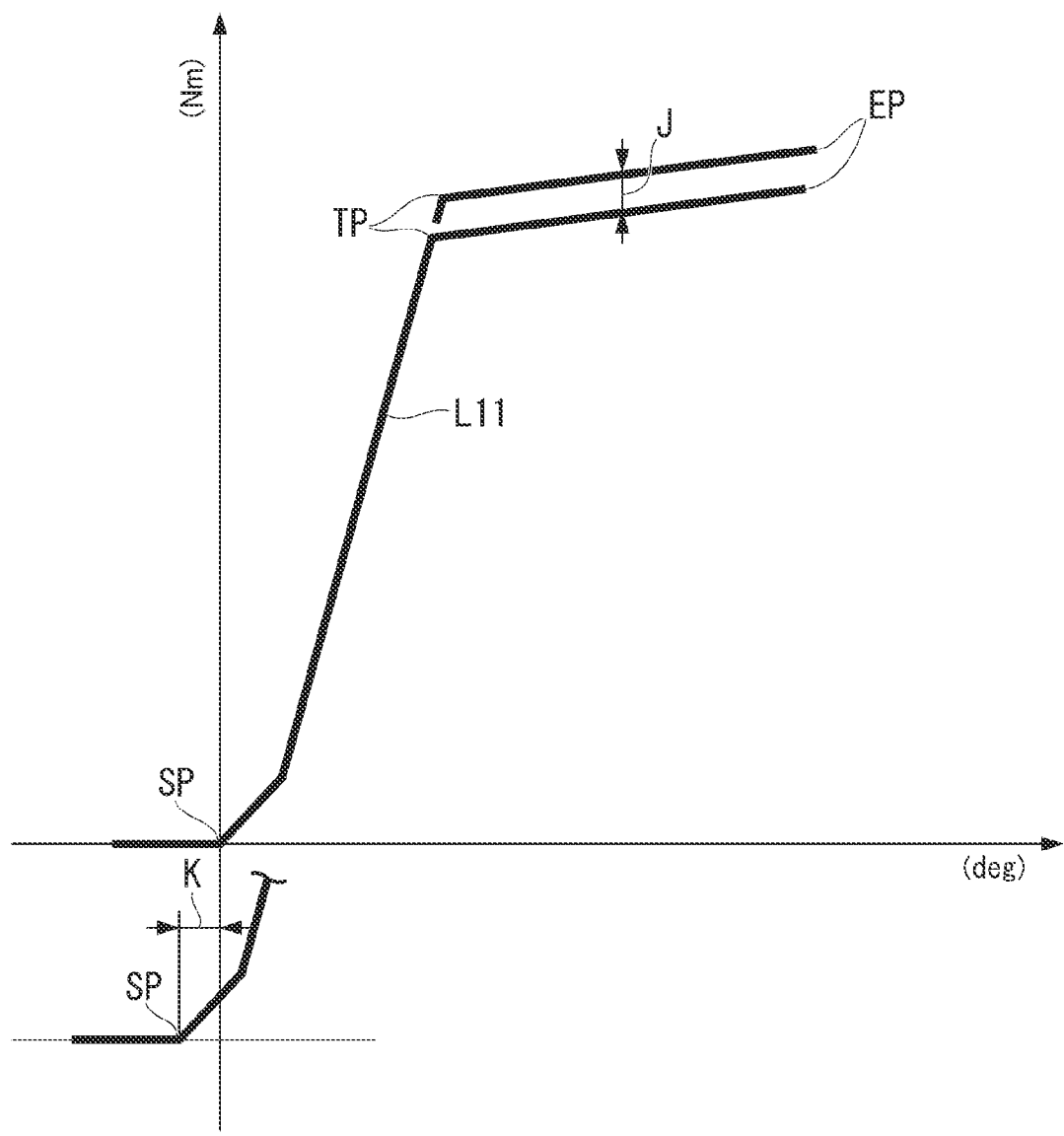
FIG. 14 is a graph corresponding to FIG. 12, and shows a second action of the embodiment.

Next, control for learning a current and an angle at the touch point TP or the like of the embodiment will be described with reference to a graph in FIG. 14. The graph of FIG. 14 shows how the correlation line L11 indicating clutch characteristics shown in FIGS. 12 and 13 changes. This change occurs according to wear of the clutch plate 35 and a temperature of the engine 13 (for example, a cooling water temperature). In FIG. 14, the vertical axis indicates the driven clutch lever torque (Nm), and the horizontal axis indicates the driven clutch lever operating angle (deg).

In the embodiment, for example, when a main switch (a power supply) of the motorcycle 1 is turned on or off, a zero point (the operation start position SP and the touch point TP) during the clutch capacity control is corrected. In the current control of the motor 52, a temperature change affects the motor torque. For this reason, a height of the correlation line L11 changes depending on a temperature (refer to J in FIG. 14). Therefore, for example, the zero point is corrected in each of a plurality of temperature ranges, such as whether an engine temperature is 80 degrees or higher (whether the engine has been warmed up). The zero point at this time is stored in a memory and used for the next clutch capacity control.

An example of a procedure for setting (learning) the operation start position SP and the touch point TP will be described. First, for example, when power of the clutch control unit 40C is turned on or off, the clutch actuator 50 is actuated. At this time, a change in current value is measured until the clutch device 26 is disconnected. Next, a gradient (a change rate) of change in current value from the play region A to the half-clutch region B is detected. In addition, a gradient (a change rate) of change in current value from the half-clutch region B to the clutch disconnected region C is detected. A point at which a gradient of the former is equal to or greater than a threshold value is set as the operation start position SP. A point at which a gradient of the latter is equal to or less than a threshold value is set as the touch point TP.

Alternatively, the following portion may be learned as the operation start position SP. This portion is a portion where a current is increased using a ramp from the clutch play region and an angular speed of the rotation angle sensor starts to decelerate from a point where it has accelerated (a portion at which the speed reaches a maximum speed).

Conversely, the following portion may be learned as the touch point TP. This portion is a portion where a current is decreased using the ramp from the clutch disconnected state (held in region) and the angular speed of the rotation angle sensor starts to decelerate from the point where it has accelerated (the portion at which the speed reaches the maximum speed).

In addition, at the same timing as described above, it is determined whether the driving clutch lever operating angle has decreased by a specified value or more. When the driven clutch lever operating angle is greatly decreased, there is a possibility that wear of the clutch plate 35 occurs.

That is, in a normally closed clutch, when the clutch plate 35 wears, the lifter shaft 39 moves away from the release mechanism 38. As a result, play in the release mechanism 38 is reduced as the clutch plate 35 wears. This causes the release shaft 53 to actuate the clutch device 26 to a disconnection side at a small operating angle. As a result, the driven clutch lever operating angle decreases at the operation start position SP where the play region A is switched to the half-clutch region B (refer to K in FIG. 14). Therefore, when the driven clutch lever operating angle at the operation start position SP has decreased by a specified value or more, it is possible to predict that the wear of the clutch plate 35 occurs. When the wear of the clutch plate 35 is predicted (detected), it is possible to warn a user using an indicator 40d (refer to FIG. 3) provided in a meter device or the like.

A motor current and a lever operating angle at the touch point TP, or the like are learned each time the power of the motorcycle 1 is turned on or off. This makes it possible to perform control using the touch point TP or the like with high accuracy. In addition, it is also possible to predict (detect) the wear of the clutch plate 35.

Based on the relationship between the lever operating angle and the motor current, the motor current and the lever operating angle at the touch point TP where the clutch device 26 starts connection are learned. This makes it possible to perform clutch control in consideration of effects of friction, wear, and a temperature.

<Control for Two Motor>

In the embodiment, the two motors 521 and 522 in the clutch actuator 50 may be configured to cooperate to drive the release shaft 53 (to connect and disconnect the clutch device 26). In this case, by halving a load shared by the two motors 521 and 522, the motors 521 and 522 can be decreased in size. As a result, a degree of freedom in a layout of the motor 52 increases, compared to a case where a large single motor 52 is provided. For this reason, as shown in FIGS. 15 to 17, even when the clutch actuator 50 is disposed on an outer side of the power unit PU, it is easy to suppress a protrusion of the clutch actuator 50 to the outside in the vehicle width direction. Therefore, it is possible to substantially decrease the clutch control device 40A in size.

In driving the two motors 52, when the resistance values differ from each other based on individual differences between the motors 52, there are the following possibilities. That is, even if the same duty is applied to each motor 52, a current flowing through only one of the two motors 52 may increase. That is, even if the same duty is applied to the two motors 52, there is a possibility that an amount of current that flows through both motors may vary depending on individual variations, temperature conditions, and the like.

Figure 19:
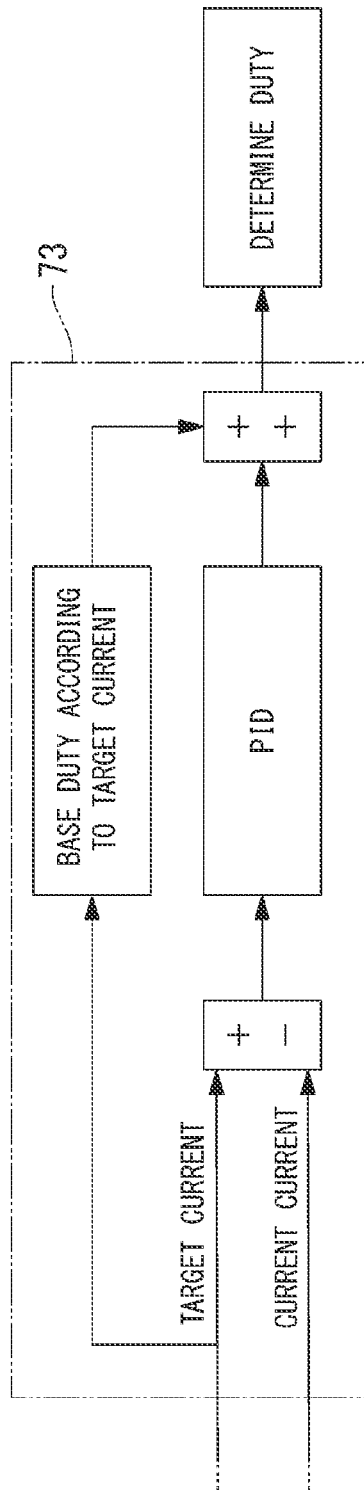
FIG. 19 is a functional block diagram related to determination of a motor DUTY of the clutch actuator.

With reference to FIG. 19, in the embodiment, in performing control such that the release shaft 53 has a target angle, a current value is configured to be feedback-controlled in an inner loop. That is, each motor 52 performs PID control based on a difference between a target current and a current current. In addition, in parallel with this control, a preset base duty is configured to be obtained according to the target current, and a duty of each motor 52 is configured to be determined by adding these. By cascading the control loops and controlling a current, temperature effects can be resolved in a current feedback loop. A reference numeral 73 in FIG. 18 indicates a duty information generation unit that generates duty information for each motor 52 based on the target current and the current current.

In addition, by driving the two motors 52, the load shared by each motor 52 can be halved. For this reason, it is possible to suppress variations in an amount of heat generated by each motor 52. As a result, it is possible to reduce an influence of temperature on each motor 52 when the clutch actuator is operated.

In the clutch actuator 50, one of the plurality (two) of motors 52 may be used as a drive source of the release shaft 53 during a normal operation (during a non-fail operation), and the other one may be used for another purpose. For example, the other motor 52 may be refrained from operating for fail-safe or used as a current sensor.

When one motor 52 fails, friction of the clutch actuator 50 when the clutch position is held increases. In addition, it also affects a response speed of clutch drive.

In the embodiment, even if one of the motors 52 fails in the system, the following measures are taken within a range of one failure. That is, by releasing (OFF) the clutch once, an influence on the behavior of the vehicle body is suppressed.

Figure 20:
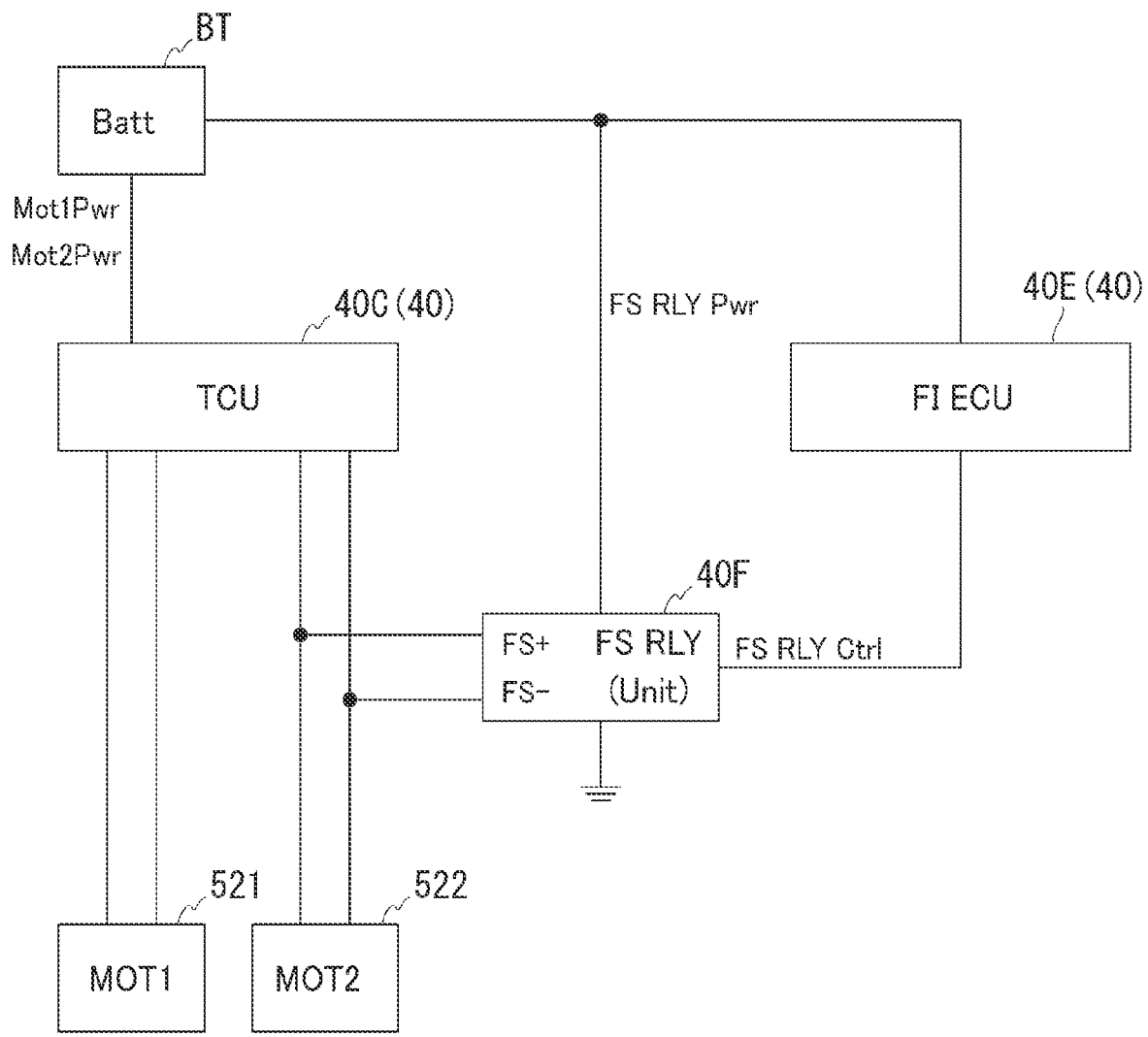
FIG. 20 is a functional block diagram which shows a relationship between two motors of the clutch actuator and a control unit.

Referring to FIG. 20, each motor 52 is driven and controlled by a common clutch control unit 40C during normal operation (during a non-fail operation). A battery BT, which is an in-vehicle power supply, is connected to a current supply line of one motor 52 via a fail-safe relay 40F. An engine control unit 40E is connected to the fail-safe relay 40F via a control line. In FIG. 20, only one motor 52 is connected to the fail-safe relay 40F. Alternatively, the two motors 52 may also be configured to be connected to the fail-safe relay 40F, respectively.

If a failure has occurred in one of the motors 52, the following measures are taken. That is, by driving the fail-safe relay 40F via the engine control unit 40E, control of the motor 52 to which the fail-safe relay 40F is connected can be temporarily taken. As a result, it is possible to realize control of gradually connecting the clutch from disconnection. Likewise, when a failure has occurred in the clutch control unit 40C, the motor 52 to which the fail-safe relay 40F is connected can be controlled by the engine control unit 40E. When the engine control unit 40E and the fail-safe relay 40F fail, the driving of the motor 52 is continued by the clutch control unit 40C.

Figure 21:
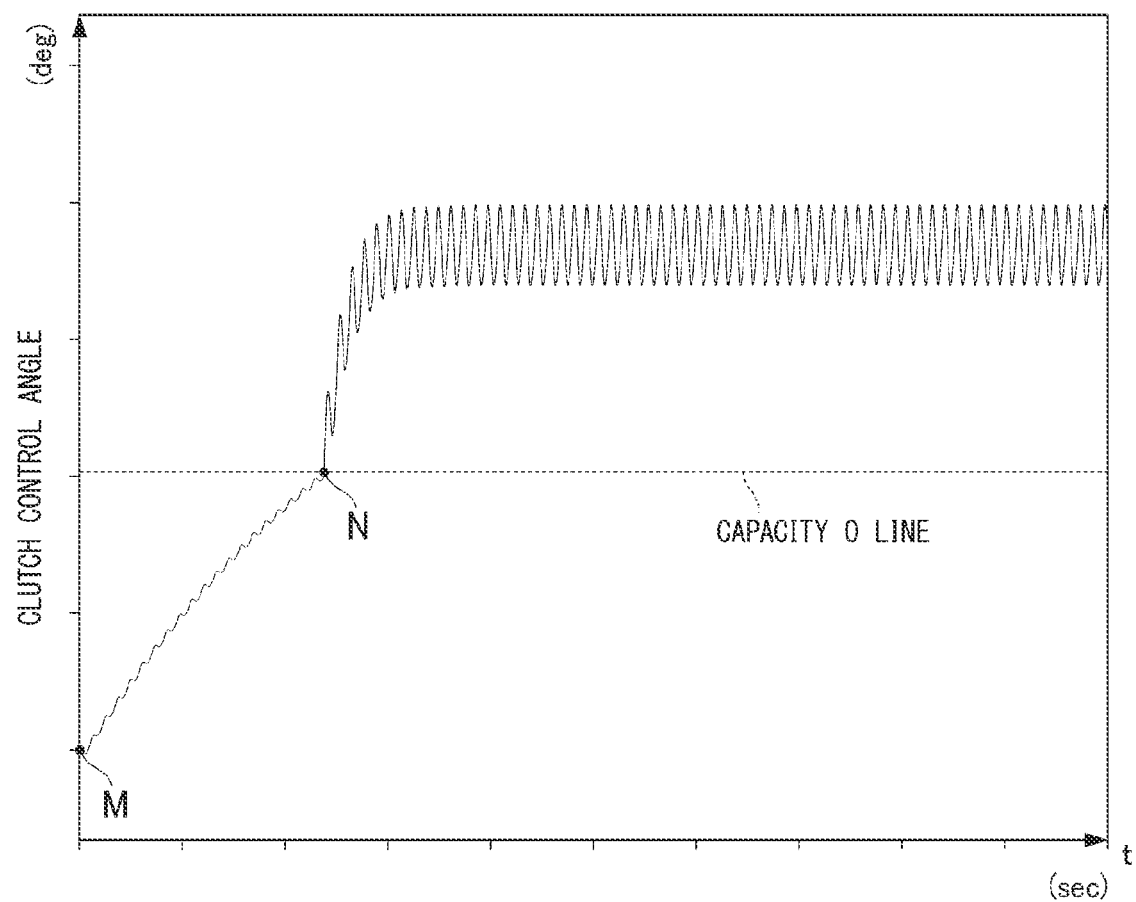
FIG. 21 is a graph which shows a deviation of a clutch control position (angle) when one of the two motors and the control unit fails.

Referring to FIG. 21, when one of the two motors 521 and 522 becomes undrivable (during one failure), the other motor is driven to disconnect the clutch device 26. In the embodiment, the clutch device 26 is driven to the standby position DP or full lift position EP (a point M in FIG. 21). After that, as the control of gradually connecting the clutch device 26 from the disconnected state, a control position (angle) of the clutch device 26 is returned to a capacity 0 line (corresponding to the touch point TP) (a point N in FIG. 21). After that, the fail-safe relay 40F is intermittently driven to gradually connect the clutch device 26. In this control, it is assumed that the motor 52 can be urgently controlled from a different route (control by the engine control unit 40E) from a normal control route (control by the clutch control unit 40C). By intermittently driving and gradually connecting the clutch device 26 in this manner, it is possible to suppress the behavior of the vehicle body moderately.

As described above, the clutch control device of the embodiment described above includes the clutch device 26 configured to connect or disconnect power transmission between the engine 13 and the transmission 21, the clutch actuator 50 configured to output a drive force for actuating the clutch device 26, and the control unit 40 configured to control the driving of the clutch actuator 50. The clutch actuator 50 includes a plurality of motors 521 and 522 that output the drive force.

According to this configuration, the clutch actuator 50 includes a plurality of motors 521 and 522, and thereby it is possible to reduce a load on each motor 521 or 522 and achieve a decrease in size. In addition, it is possible to achieve fail-safe of the clutch driving system by the plurality of motors 521 and 522.

In addition, in the clutch control device described above, the control unit 40 may feedback-control a current supplied to each of the plurality of motors 521 and 522.

According to this configuration, it is possible to suppress variations in load among the plurality of motors 521 and 522 by feedback-controlling a current supplied to each of the motors 521 and 522 to a target value.

In the clutch control device described above, the control unit 40 may include the clutch control unit 40C and the engine control unit 40E independent from each other. Each of the plurality of motors 521 and 522 may be independently controllable by any one of the clutch control unit 40C and the engine control unit 40E.

According to this configuration, any one of the clutch control unit 40C and the engine control unit 40E can drive a normal one of the plurality of motors 521 and 522. For this reason, it is possible to continue driving the clutch actuator 50. This effect can be obtained even if one of the plurality of motors 521 and 522 fails or one of the plurality of the clutch control unit 40C and the engine control unit 40E malfunctions, and one of the plurality of motors 521 and 522 is not drivable.

In addition, in the clutch control device described above, when one of the plurality of motors 521 and 522 becomes undrivable, the clutch device 26 may be once disconnected by the other of the plurality of drive sources 521 and 522, and then be gradually connected thereafter.

According to this configuration, it is possible to prevent the clutch device 26 from being maintained in the connected state even when an abnormality has occurred in driving one of the plurality of motors 521 and 522. In addition, it is possible to suppress a change in the behavior of the vehicle by gradually shifting to the connected state after the clutch device 26 is disconnected.

When one of the plurality of motors 521 and 522 becomes undrivable in the clutch control device described above, a drive current for driving the other of the plurality of motors 521 and 522 may be set larger than that for normal drive before it fails. As a result, when one of the plurality of motors 521 and 522 has failed, a lack of power can be eliminated.

On the other hand, a process of connecting the clutch device 26 after disconnecting it once is configured to be performed in only one cycle, and thereby the following effects are obtained. That is, the actuator is driven with a current value larger than a normal control amount, driven to a fail stop position in one cycle, and stopped. As a result, it is possible to shift to a fail mode while suppressing heat generation with a minimum operation.

The present invention is not limited to the examples described above. For example, the clutch operator is not limited to the clutch lever, and may be a clutch pedal or other various operators. The clutch device is not limited to a device disposed between the engine and the transmission, but may be a device disposed between the prime mover and any output targets other than the transmission. The prime mover is not limited to an internal combustion engine and may be an electric motor.

The application is not limited to a saddle type vehicle in which the clutch operation is automated as in the embodiment described above. The application can be made for, for example, a saddle type vehicle which, while based on a manual clutch operation, can perform transmission by adjusting the drive force without performing a manual clutch operation under certain conditions (a so-called saddle type vehicle equipped with a transmission without a clutch operation).

In addition, the saddle type vehicle includes all types of vehicles in which the driver straddles a vehicle body, includes not only motorcycles (including bicycles with prime movers and scooter type vehicles) but also three-wheel vehicles (includes vehicles with two front wheels and one rear wheel as well as vehicles with one front wheel and two rear wheels) or four-wheel vehicles, and includes vehicles including an electric motor as a prime mover.

The configuration in the embodiment described above is an example of the present invention, and various modifications are possible within a range not departing from the gist of the invention.

BRIEF DESCRIPTION OF THE REFERENCE SYMBOLS

1: Motorcycle (Saddle type vehicle)
13: Engine (Prime mover)
21: Transmission (Output target)
26: Clutch device
40: Control unit
40A: Clutch control device
40C: Clutch control unit (Drive control means)
40E: Engine control unit (Drive control means)
50: Clutch actuator
521, 522: Motor (Drive source)

What is claim is:
1. A clutch control device comprising:
a clutch device configured to connect or disconnect power transmission between a prime mover and an output target;
a clutch actuator configured to output a drive force for actuating the clutch device; and
a control unit configured to control driving of the clutch actuator,
wherein the clutch actuator includes a plurality of drive sources that output the drive force, and
when one of the plurality of drive sources becomes undrivable, the clutch device is once disconnected by the other of the plurality of drive sources, and then is gradually connected thereafter.
2. The clutch control device according to claim 1, wherein the control unit feedback-controls a current supplied to each of the plurality of drive sources.
3. The clutch control device according to claim 1, wherein the control unit includes a plurality of drive control means independent from each other, and
each of the plurality of drive sources is independently controllable by any one of the plurality of drive control means.
4. The clutch control device according to claim 1, wherein, when one of the plurality of drive sources becomes undrivable, a drive current for driving the other of the plurality of drive sources is set larger than that for normal drive, and only one cycle of clutch disconnection and connection is performed.

5. The clutch control device according to claim 1,
   wherein a fail-safe relay is included in a current supply line of the plurality of drive sources, and
   the clutch device is gradually connected by intermittently driving the fail-safe relay when a failure has occurred in one of the plurality of drive sources.

6. The clutch control device according to claim 5,
   wherein the control unit includes a plurality of drive control means independent from each other, and
   the fail-safe relay is configured to be controllable by a second control means different from a first drive control means that controls the plurality of drive sources during a normal operation.

* * * * *